United States Patent
Pantelidou et al.

(10) Patent No.: US 11,622,291 B2
(45) Date of Patent: Apr. 4, 2023

(54) AI/ML DATA COLLECTION AND USAGE POSSIBLY FOR MDTS

(71) Applicant: Nokia Technologies Oy, Espoo (FI)

(72) Inventors: Anna Pantelidou, Massy (FR); Peter Rost, Heidelberg (DE); Borislava Gajic, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 116 days.

(21) Appl. No.: 17/395,960

(22) Filed: Aug. 6, 2021

(65) Prior Publication Data

US 2023/0044727 A1   Feb. 9, 2023

(51) Int. Cl.
*H04W 24/10* (2009.01)
*G06N 5/04* (2023.01)

(52) U.S. Cl.
CPC .............. *H04W 24/10* (2013.01); *G06N 5/04* (2013.01)

(58) Field of Classification Search
CPC ................................. H04W 24/10; G06N 5/04
See application file for complete search history.

(56) References Cited

U.S. PATENT DOCUMENTS

| 2014/0155056 A1 | 6/2014 | Jactat et al. ................ 455/422.1 |
| 2018/0164279 A1* | 6/2018 | Serwane ............ G01N 33/5082 |
| 2022/0245527 A1* | 8/2022 | Choi ........................ G06N 20/20 |

FOREIGN PATENT DOCUMENTS

WO   WO-2019/136941 A   7/2019

OTHER PUBLICATIONS

"AI/ML enabled RAN and NR Air Interface", Intel Corporation, 3GPP TSG RAN Release 18 Workshop, RWS-210373, Jul. 2021, 12 pages.
"Email discussion summary for [AN-R18-WS-crossFunc-Qualcomm]", Qualcomm, 3GPP TSG RAN Rel-18 workshop, RWS-210637, Jul. 2021, 67 pages.

* cited by examiner

*Primary Examiner* — Ronald B Abelson
(74) *Attorney, Agent, or Firm* — Harrington & Smith

(57) ABSTRACT

A UE transmits a capability message to an access node in a wireless network, indicating capability corresponding to ML of the UE at a current time instance. The UE receives a configuration message for radio measurements, indicating set(s) of parameters to be measured. The UE receives a configured capability in a message and matches the configured capability with the capability of the user equipment at the current time instance. The UE measures the set(s) of parameters. The UE uses ML to infer value(s) for at least one of the parameters based on the measured set(s) of parameters and based on the received configured capability. The UE reports the inferred value(s) for the at least one parameter. An access node receives the capability message, determines and sends the configuration message and configured capability receives the reporting.

20 Claims, 10 Drawing Sheets

Configuration Examples

1- Normal measurements with corresponding measurement parameters
2- Inferred measurements with corresponding measurement parameters
    2.a- prediction reporting or logging criteria
    2.b- triggering information for reporting/logging
    2.c- may include indication of expected measurements, e.g., a distance from expected measurements
    2.d- Indication may be related to or include exiting condition(s), e.g., if there are X measurements above a value, stop 3- The NW may use different SRBs for prediction measurements versus normal measurements 4- There may be a single configuration, possibly with triggering and/or exiting conditions – could be different (or the same) for normal/ML, or multiple configurations; also frequencies or other resources for measurements could be different 5- The NW may include priorities, such that a higher priority for transmission could be placed on predictions using inferred measurements, and a lower priority for transmission of normal measurements (or the opposite)

FIG. 3A

| NR | | | | | | | |
|---|---|---|---|---|---|---|---|
| Bit 8 | Bit 7 | Bit 6 | Bit 5 | Bit 4 | Bit 3 | Bit 2 | Bit 1 |
| Spare (Indication for ML inferred measurements activation) | logging of M1 from event triggered measurement reports according to existing RRM configuration. Value "1" indicates "activate" and value "0" indicates "do not activate". | M7 | M6 | M5 | M4 | M2 | M1 |

FIG. 4

| Additional octet(s) | | | | | | | |
|---|---|---|---|---|---|---|---|
| Prediction 1 | Prediction 1 | Prediction 1 | Prediction 1 | Prediction 2 | Prediction 2 | Prediction 2 | Prediction 2 |

| Bit 8 | Bit 7 | Bit 6 | Bit 5 | Bit 4 | Bit 3 | Bit 2 | Bit 1 |
|---|---|---|---|---|---|---|---|
| Reserved (ML inferred measurements available) | All configured RRM event triggers for UMTS | All configured RRM event triggers for LTE | A2 event triggered periodic for LTE and NR | Event 1I for UMTS 1.28 MCPS TDD | Event 1F for UMTS | Event A2 for LTE and NR | Periodical |

AI/ML DATA COLLECTION AND USAGE POSSIBLY FOR MDTS

TECHNICAL FIELD

Exemplary embodiments herein relate generally to wireless communications, and, more specifically, relate to providing data to the network obtained by using Artificial Intelligence (AI)/Machine Learning (ML) at the UE, also often abbreviated as AI/ML. As one example, the data can be collected at the UE by extensions of the Minimization of Drive Tests (MDTs) reporting.

BACKGROUND

Minimization of drive tests (MDT) is a standardized mechanism introduced in third generation partnership project (3GPP) Release 10 to provide operators with network performance optimization tools in a cost-efficient manner. The main characteristics of MDT can be summarized below:

1) The operator is able to configure measurements made by a user equipment (UE) independently from the network configuration.

2) The UE reports measurement logs at a particular event (e.g., radio link failure).

3) The operator has the possibility to configure the logging in geographical areas.

4) The measurements can be linked with information which makes it possible to derive the location information.

5) The measurement may be linked to a time stamp.

6) The UE for measurements may provide device-type information, for selecting the correct UEs for specific measurements.

AI/ML (Artificial Intelligence/Machine Learning) is currently being studied in 3GPP RAN WG3 (see the Study Item Description (SID) in RP-201620; see CMCC, "Revised SID: Study on enhancement for data collection for NR and ENDC", RP-201620, 3GPP TSG RAN Meeting #89e, Electronic Meeting, Sep. 14-18, 2020). According to the SID, Artificial Intelligence (AI) including machine learning (ML) algorithms are considered to provide a powerful tool to help operators to improve the network management and the user experience by providing insights based on autonomous analysis and processing of collected data.

There is an effort to combine AI/ML techniques with MDT, although AI/ML has broader applicability than just MDT in wireless networks.

BRIEF SUMMARY

This section is intended to include examples and is not intended to be limiting.

In an exemplary embodiment, a method is disclosed that includes transmitting by a user equipment a capability message to an access node in a wireless network. The capability message indicates capability corresponding to machine learning of the user equipment at a current time instance. The method includes receiving, by the user equipment from the access node, a configuration message for radio measurements, the message indicating one or more sets of parameters to be measured. The method includes receiving by the user equipment a configured capability in a message from the access node and matching by the user equipment the configured capability with the capability of the user equipment at the current time instance. The method further includes measuring by the user equipment the one or more sets of parameters. The method also includes using machine learning to infer one or more values for at least one of the parameters in the one or more sets of parameters based on the measured one or more sets of parameters and based on the received configured capability. The method additionally includes reporting from the user equipment to the access node the inferred one or more values for the at least one parameter.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: transmit by a user equipment a capability message to an access node in a wireless network, wherein the capability message indicates capability corresponding to machine learning of the user equipment at a current time instance; receive, by the user equipment from the access node, a configuration message for radio measurements, the message indicating one or more sets of parameters to be measured; receive by the user equipment a configured capability in a message from the access node and matching by the user equipment the configured capability with the capability of the user equipment at the current time instance; measure by the user equipment the one or more sets of parameters; use machine learning to infer one or more values for at least one of the parameters in the one or more sets of parameters based on the measured one or more sets of parameters and based on the received configured capability; and report from the user equipment to the access node the inferred one or more values for the at least one parameter.

An exemplary computer program product includes a computer-readable storage medium bearing computer program code embodied therein for use with a computer. The computer program code includes: code for transmitting by a user equipment a capability message to an access node in a wireless network, wherein the capability message indicates capability corresponding to machine learning of the user equipment at a current time instance; code for receiving, by the user equipment from the access node, a configuration message for radio measurements, the message indicating one or more sets of parameters to be measured; code for receiving by the user equipment a configured capability in a message from the access node and matching by the user equipment the configured capability with the capability of the user equipment at the current time instance; code for measuring by the user equipment the one or more sets of parameters; code for using machine learning to infer one or more values for at least one of the parameters in the one or more sets of parameters based on the measured one or more sets of parameters and based on the received configured capability; and code for reporting from the user equipment to the access node the inferred one or more values for the at least one parameter.

In another exemplary embodiment, an apparatus comprises means for performing transmitting by a user equipment a capability message to an access node in a wireless network, wherein the capability message indicates capability corresponding to machine learning of the user equipment at a current time instance; receiving, by the user equipment from the access node, a configuration message for radio measurements, the message indicating one or more sets of parameters to be measured; receiving by the user equipment a configured capability in a message from the access node and matching by the user equipment the configured capability with the capability of the user equipment at the current time instance; measuring by the user equipment the one or more sets of parameters; using machine learning to infer one or more values for at least one of the parameters in the one or more sets of parameters based on the measured one or more sets of parameters and based on the received configured capability; and reporting from the user equipment to the access node the inferred one or more values for the at least one parameter.

In an exemplary embodiment, a method is disclosed that include receiving, at an access node in a wireless network from a user equipment in the wireless network, a capability message indicating capability corresponding to machine learning of the user equipment at a current time instance. The method also includes sending, by the access node to the user equipment, a configuration message for radio measurements. The message indicates one or more sets of parameters to be measured by the user equipment and to be used for machine learning to infer one or more values for at least one of the parameters in the one or more sets of parameters. The method includes sending, by the access node to the user equipment, a configured capability from the access node corresponding to the capability message received from the user equipment and to be used by the user equipment for the machine learning. The method includes receiving, by the access node from the user equipment, reporting indicating the inferred one or more values for the at least one parameter in the one or more sets of parameters.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, at an access node in a wireless network from a user equipment in the wireless network, a capability message indicating capability corresponding to machine learning of the user equipment at a current time instance; send, by the access node to the user equipment, a configuration message for radio measurements, the message indicating one or more sets of parameters to be measured by the user equipment and to be used for machine learning to infer one or more values for at least one of the parameters in the one or more sets of parameters; send, by the access node to the user equipment, a configured capability from the access node corresponding to the capability message received from the user equipment and to be used by the user equipment for the machine learning; and receive, by the access node from the user equipment, reporting indicating the inferred one or more values for the at least one parameter in the one or more sets of parameters.

An exemplary computer program product includes a computer-readable storage medium bearing computer program code embodied therein for use with a computer. The computer program code includes: code for receiving, at an access node in a wireless network from a user equipment in the wireless network, a capability message indicating capability corresponding to machine learning of the user equipment at a current time instance; code for sending, by the access node to the user equipment, a configuration message for radio measurements, the message indicating one or more sets of parameters to be measured by the user equipment and to be used for machine learning to infer one or more values for at least one of the parameters in the one or more sets of parameters; code for sending, by the access node to the user equipment, a configured capability from the access node corresponding to the capability message received from the user equipment and to be used by the user equipment for the machine learning; and code for receiving, by the access node from the user equipment, reporting indicating the inferred one or more values for the at least one parameter in the one or more sets of parameters.

In another exemplary embodiment, an apparatus comprises means for performing: receiving, at an access node in a wireless network from a user equipment in the wireless network, a capability message indicating capability corresponding to machine learning of the user equipment at a current time instance; sending, by the access node to the user equipment, a configuration message for radio measurements, the message indicating one or more sets of parameters to be measured by the user equipment and to be used for machine learning to infer one or more values for at least one of the parameters in the one or more sets of parameters; sending, by the access node to the user equipment, a configured capability from the access node corresponding to the capability message received from the user equipment and to be used by the user equipment for the machine learning; and receiving, by the access node from the user equipment, reporting indicating the inferred one or more values for the at least one parameter in the one or more sets of parameters.

BRIEF DESCRIPTION OF THE DRAWINGS

In the attached Drawing Figures:

FIG. 3A illustrates a number of configuration examples for MDT configuration, in accordance with exemplary embodiments;

FIG. 4 is a table having a list of NR measurements to be performed by a UE, in accordance with an exemplary embodiment;

FIG. 4A is an example of additional octet(s) that may be used in order to report predictions;

FIG. 5 is a table indicating the reporting trigger for UE measurements, namely periodic, event-based periodic and event-based reporting;

FIG. 7, split into

DETAILED DESCRIPTION OF THE DRAWINGS

Figure 1:
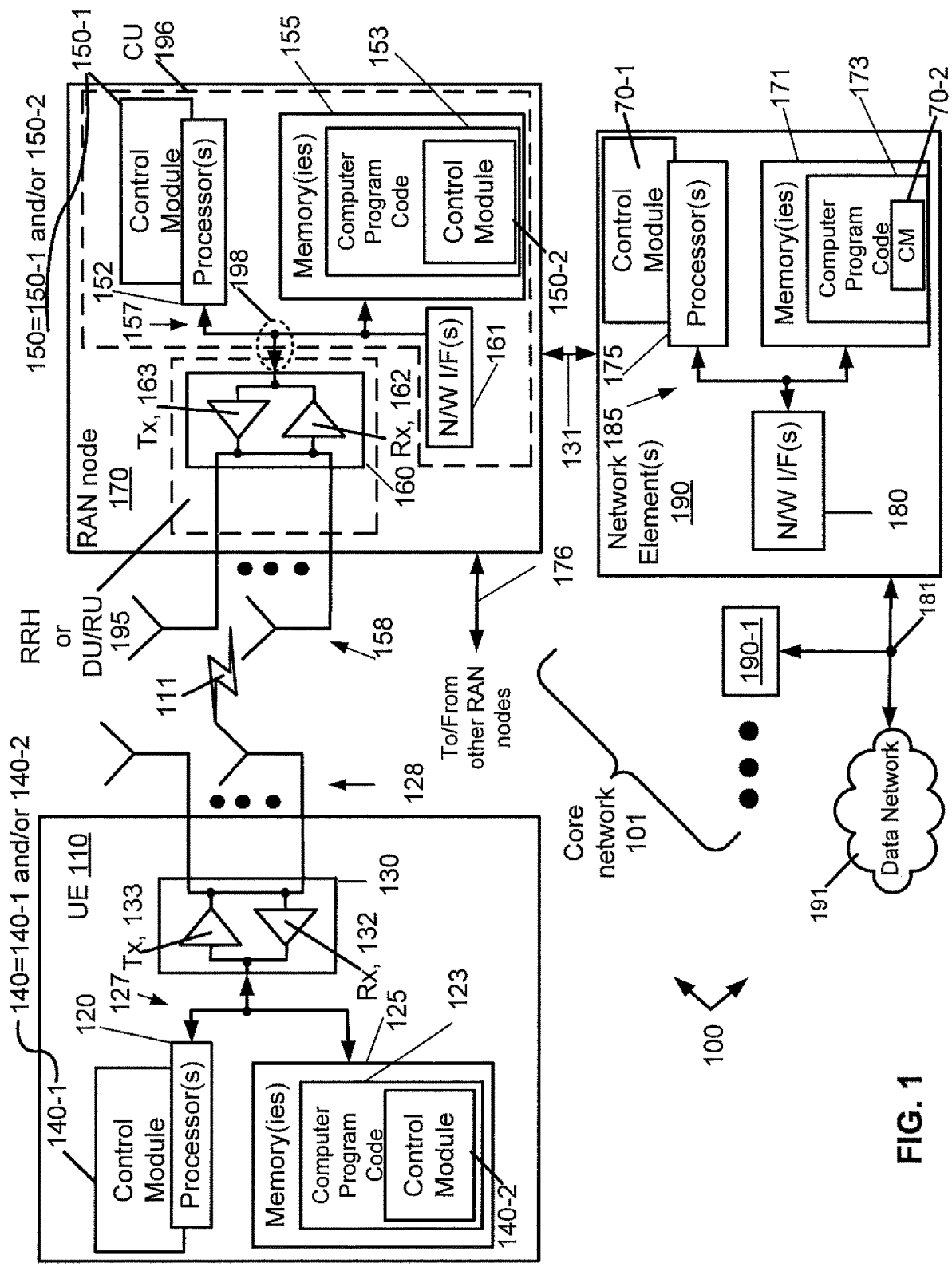
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The exemplary embodiments herein describe techniques for MDT extensions for AI/ML data collection. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated, where this example has multiple network elements 109, 190-1, and possibly more elements.

In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100, and therefore is an access node to the network 100. As described below, the RAN node 170 may include multiple physical devices. The RAN node 170 is considered to be a gNB herein, though this is only one example. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-DU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of six cells.

The wireless network 100 may include a network element or elements 190 that may include core network functionality, and which provides connectivity via a link or links 181 with a data network 191, such as a telephone network and/or a data communications network (e.g., the Internet). Multiple network elements 190, 190-1, . . . , may be part of a core network 101, which may be a 5GC. The link(s) 181 may connect the network elements 190 and the data network 191, or there may be additional link(s) (not shown) to connect the network elements 190 and the link(s) 181 to connect the data network 191 to the core network 101 and/or the network elements 190. Core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an Si interface for LTE, or other suitable interface for other standards.

All of the various network elements 190, 190-1, and the like, are assumed to be similar, so only exemplary circuitry of a single network element 190 is described herein. This network element 190 includes one or more processors 175, one or more memories 171, and one or more network interfaces (N/W I/F(s)) 180, interconnected through one or more buses 185. The one or more memories 171 include computer program code 173. The network element 190 includes a control module 70, comprising one of or both parts 70-1 and/or 70-2, which may be implemented in a number of ways. The control module 70 may be implemented in hardware as control module 70-1, such as being implemented as part of the one or more processors 175. The control module 70-1 may be implemented also as an integrated circuit or through other hardware such as a programmable gate array. In another example, the control module 70 may be implemented as control module (CM) 70-2, which is implemented as computer program code 173 and is executed by the one or more processors 175. For instance, the one or more memories 171 and the computer program code 173 may be configured to, with the one or more processors 175, cause the network element 190 to perform one or more of the operations as described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network node(s) 190, and other functions as described herein.

In general, the various embodiments of the user equipment 110 can include, but are not limited to, cellular telephones (such as smart phones, mobile phones, cellular phones, voice over Internet Protocol (IP) (VoIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 110 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Having thus introduced one suitable but non-limiting technical context for the practice of the exemplary embodiments, the exemplary embodiments will now be described with greater specificity.

As stated previously, AI/ML (Artificial Intelligence/Machine Learning) is currently being studied in 3GPP RAN WG3. The study focuses on the AI/ML functionality and tries to identify the corresponding types of inputs/outputs needed for the introduction of intelligence in the RAN. In addition, it focuses on the changes and enhancements of network interfaces to support AI-enabled RAN intelligence for a number of agreed use cases, e.g., energy saving, load balancing, mobility enhancements. The study is further based on the current architecture and interfaces. The study aims to reuse the existing SON/MDT procedures by using them as the baseline and by introducing new signaling when needed. Specifically, MDT has been a mechanism that was introduced to enhance data collection for SON-related use cases.

Figure 2:
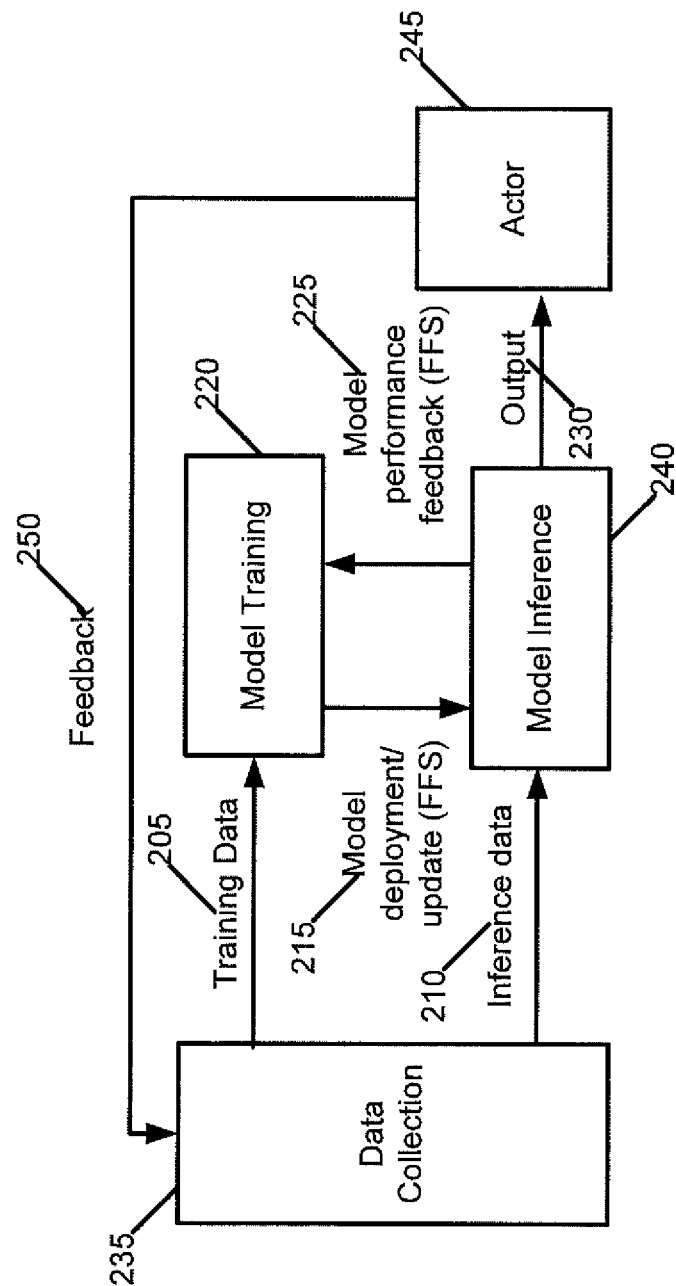
FIG. 2 is an AI/ML workflow example.

Recently, numerous 3GPP RAN contributions on AI/ML enabled features for 3GPP air interface have been submitted. Hence, AI/ML for air interface as well as NG-RAN enablers for AI/ML are likely to be part of a Rel-18 study item in 3GPP. There has been some discussion of shaping the content of such study items, and further on providing feature-independent enablers which allow for supporting/enabling AI/ML in a more general way. Examples of important workflow enablers were identified as shown in FIG. 2, which is an AI/ML workflow example. See also 3GPP TR 37.817 for similar examples.

This example involves the following entities: a data collection function 235; a model training function 220; an actor 245; a model inference function 240; and an actor 245. The data collection function 235 is performed in the environment, e.g., a wireless/cellular environment, and produces training data 205 (namely data that after proper treatment, e.g., after passing through pre-processing can be used for training) and inference data 210 (namely data that after proper treatment, e.g., after passing through pre-processing can be used for inference). The model training module 220 uses the training data 205 for training, and can deploy the trained ML model where the inference is hosted for execution. Similarly, an ML model may be re-trained at the model training and the updated retrained model be sent where the inference is hosted for execution. This is indicated through the deployment or update arrow 215, which is currently FFS, for future study in TR 37.817. The model inference function 240 uses the inference data 210 for inferencing and creates an output 230. The model inference function 240 may also output model performance feedback 225 (which is currently FFS, for future study in TR 37.817) to the model training module 220 to provide feedback on the performance of the particular model in execution. The actor 245 uses the output 230 and may provide feedback 250 to the data collection module 235. This feedback can be the normal procedures that take place for counter, performance measurements (PM) and other measurement retrieval by the network.

It would be useful to enable this workflow in the most generic way possible such that the majority of AI/ML supported features may be implemented without having feature-specific AI/ML support. Accordingly, the exemplary embodiments described below enable this workflow to support AI/ML supported features.

In a 5G system, there are multiple ways to collect data for training AI/ML algorithms for mobile networks optimization. In 3GPP SA2, the NWDAF function is standardized. NWDAF is the function responsible to collect data from other 5GC Network Functions (NFs) as well as from OAM; in OAM, data can be collected by means of Performance Measurements (PMs), KPIs, Trace and MDT Jobs, for instance. Those mechanisms are utilized to collect data for off-line training (for example, in case of supervised/unsupervised learning). However, lately there have been discussions about running ML at the UE side. This can reduce the amount of data that needs to be communicated before the network can train a specific function. Currently, there are no mechanisms instructing a UE to start calculating predictions internally and reporting those to the network.

The 3GPP [cf. 3GPP TS 37.320] specifies the concept of radio measurement collection for Minimization of Drive Tests (MDT). There are two modes for the MDT measurements: Logged MDT and Immediate MDT. Immediate MDT allows the network to collect RT measurements reported per UE or per group of UEs immediately after a UE is performing those measurements. In Logged MDT reporting, the configuration is done when UE is in connected mode and the MDT data collection is done at the UE when it enters idle or inactive mode. Deferred reports in a form of logs are then sent when entering connected mode. MDT measurement results are put into MDT Trace Records and signalled onwards to operators' OAM entity for further post-processing.

There are two ways of configuring MDT, i.e., management and signaling activation approaches. In the management-based MDT data collection, the UE selection can be performed at the gNB 170 based on the area information received from the OAM. In signaling activation, MDT activation is carried out from the core network EM and targets a specific UE, for example based on its IMSI. The activation of MDT extends the 5GC trace activation procedure [cf. 3GPP TS 32.422]. Configuration parameters of MDT are added into the message of the activated trace session. UE performance measurements activation request is propagated to the selected UE based on the UE identification information (e.g., IMSI/IMEI(SV)/IMEI-TAC/SUPI). This information may be also combined with geographical area information of the UE.

After the attachment to the network by the selected UE, the AMF forwards the MDT configurations to the corresponding gNB that serves the selected UE. If the MDT request contains the information on the area which is not satisfied via an area criterion, the AMF keeps the MDT configuration, and forwards this information towards the gNB only when the area criterion is satisfied. The MDT configuration contains all of the necessary information to perform measurements at the UE, such as the parameters identifying the list of measurements to be performed, reporting trigger, amount and interval, information on the threshold for events to be reported, information on Trace Collection Entity (TCE), and the like. The measurement parameter list for Immediate MDT defines the measurements that may be collected by a UE and utilized for RRM and can have different value e.g., in NR, as follows.

M1: DL signal quantities measurement results for the serving cell and for intra-frequency/Inter-frequency/inter-RAT neighbor cells, including cell/beam level measurement.

M2: Power headroom (PH) measurement by UE.

M3 is not yet supported.

M4: PDCP SDU Data volume measurement separately for DL and UL, per DRB per UE.

M5: Average UE throughput measurement separately for DL and UL, per DRB per UE and per UE for the DL, per DRB per UE and per UE for the UL.

M6: Packet delay measurement, separately for DL and UL, per DRB per UE.

M7: Packet loss rate measurement, separately for DL and UL, per DRB per UE.

M8: RSSI measurement by UE for WLAN and Bluetooth.

M9: RTT measurement by UE for WLAN.

When network has ML capability, a trained ML model may be executed either at the network side, e.g., at the gNB, gNB-CU, gNB-DU, etc. or at the UE side. The outcome of ML model execution is called ML Inference and generally comprises predictions. Consider, as an example, the use case of mobility and handover preparation to a cell. ML Training could take place at the network side, where also the ML Model can be executed. In this case, ML Model Inference is available at the network side. To enable the training for HO, a UE would need to report RSRP information to the network and the network, using this information, can train an ML model that predicts when to prepare a HO and towards which cell. To enable good training at the gNB side, the amount and frequency of RSRP measurements would need to be very high, which would significantly increase the overhead of communicating them from the UE to the network side. On the other hand, a UE may have downloaded an ML model internally that is trained by the UE itself using its own measurements. In this case, the UE could use the RSRP measurements, without the need to report them to the network, and could determine for example a predicted time (and possibly a cell) when the handover needs to be prepared. Having ML Model Inference (e.g., HO predictions) available at the UE side could reduce the amount of information sent to the network as the UE could send predictions to the network instead of raw measurements. Those prediction could help the network determine the actual time and cell to which the HO should be prepared. In some cases, it is preferable to perform ML inference at the UE since this could reduce the amount of measurements sent to the network. In general, one could think of many examples when UE could perform ML model execution and the network could take actions based on the ML predictions from the UE.

Different UEs may have different ML capabilities and might (or might not) be able to train locally an ML Model, e.g., using RL techniques. Furthermore, they might or might not be able to perform ML Inference in case they have been provided (e.g., through a download) with an already trained ML Model. For those UEs capable to perform ML inference by executing locally available ML Models, there are currently no mechanisms to allow them to report this inference information to the network, namely there are no means to expose ML inference performed locally at UE and make the rest of the network aware of such information. Therefore, such local ML inference information cannot be used by other network entities in order to improve overall network performance. Furthermore, currently there are no mechanisms that allow the network to trigger the starting and ending of ML Inference measurements by one or more UEs in the network.

For UE-assisted ML, consider the following issues that need to be addressed. Inference at the UE may regard many different features that should not be individually specified and should not utilize separate channels/interfaces for distribution of inference. Meanwhile, AI/ML is a quickly changing field, and at the time of specification it may not be clear which AI runs on which UE. Additionally, different network entities may utilize UE inference, and it is desirable to avoid extensive capability signaling to inform a UE which network entity would be able to utilize inference data. Moreover, it is very likely that UE vendors do not want to expose the models and data used for the models; however, inference on the UE-side may improve network performance, e.g., by providing supplementary information on predicted states.

To address these and other issues, the following are possible examples of improvements for exemplary embodiments herein to enable MDT to trigger one or more UEs to provide the network with ML-related measurements by further controlling the amount, frequency and the stopping conditions for the mentioned ML information. These provide an overview, and additional detailed information is provided below.

In one example, the UE 110 may indicate to the network 100 a capability to provide prediction data/quantities. This capability may depend on the ML algorithms that UE has access to and is able to execute. As an example, the UE may indicate to the network that it is capable to provide predictions for ML Algorithm A but not for ML Algorithm B if the latter involves more complex calculations. Knowing the UE ML capability for a specific algorithm the network can configure accordingly ML Inference measurements at the UE. UE can indicate its ML capability to the network by sending a message to the gNB to which it is connected. In case of split architectures, the UE indicates its ML capability to the gNB-CU. This information may subsequently be propagated to the management plane or to the core network by the gNB (gNB-CU) so that the management plane/core can configure ML Inference measurements from different UEs according to their ML capability. ML capability of a UE may be changing over time depending for example on the UEs' residual memory or battery power. Therefore, ML Capability needs to be indicated by the UE to the network every time this Capability changes and different inference information is possible. As another option, a UE does not indicate its ML Capability to network. As a further possible option, even though a UE indicates to its gNB or gNB-CU its ML capability, the latter do not propagate this information to the management plane or to the core network. In a such a case, if a UE is not ML Capable, the UE may ignore the ML configuration. As a further possibility, it may send an indication to the network to inform inability to perform ML Inference. As a further possibility, it may send a message to the network to inform it in case it is capable to perform ML Inference over other, less complex algorithms.

In terms of the capability of the UE, this can include multiple criteria, which can change over time. For example, UE capability may be time-varying, depending on such criteria as the UE's remaining memory, whether the UE is connected to power, processing power able to devote to ML, and the like. The term "capability" therefore may cover ML capabilities and also the UE's internal state such as hardware or software restrictions for the UE, or even a combination of these (e.g., an ML algorithm may need a certain amount of processing power/memory, which the UE may or may not have at a given instant in time). That is, a capability may not be an existing UE capability in the sense that the capability is fixed per UE, but may instead be a time-varying capability that depends on the current internal state of the UE and its ability to perform inference.

In a further example, configuring may be performed towards a UE by a management plane (e.g., OAM) or by one or more network elements 190 in the core network 101 via a configuration instructing the UE 110 to report its ML actions/inference when the UE performs local ML. The network 100 can configure predictions to UE taking into account the UE ML capabilities to provide predictions. To convey this information, area-based or signaling-based Immediate and Logged MDT configuration can be extended.

For instance, to report ML inference, the MDT framework may be used. In this case, model inference may be reported as part of MDT measurements in similar ways as in Immediate MDT, when real-time measurements are reported from a UE in an RRC Connected state. In this case, instead of real-time measurements UE will need to report ML Inference as soon as the latter is being calculated by for instance RL methods. In certain cases, UE may need to also store ML inference information internally before it is able to calculate the final result to be reported to the network. This for example can be the case if the prediction to be reported depends on intermediate prediction steps.

ML inference may also be reported for non-real-time measurements. In this case, ML inference may additionally be logged as part of Logged MDT. This can be the case if inference happens when the UE is in RRC Idle or RRC Inactive states (e.g., when UE identifies it is out of coverage). UE will need to have an internal variable to log ML inference similarly to logging normal MDT measurements in Logged MDT.

An indicator in the measurement configuration (e.g., in MDT configuration) can signal to the UE whether the UE should report or log a) only normal measurements, b) only inferred data/predictions or c) both normal measurements and inferred data. The MDT configuration to report ML Inference can be included inside Trace Session Activation message and ML Inference can be reported as part of Trace Record, using either file-based or streaming-based methods. Consider the following examples.

A) If the indicator indicates that only normal measurements should be performed by the UE, then a first set of measurement parameters is indicated in the configuration (e.g., RSRP measurements, PDCP SDU data volume, and the like may be reported by the UE as in existing specifications).

B) If the indicator indicates that only inferred data should be provided by the UE, then a second set of measurement parameters is indicated. Those will be parameters to be predicted by the UE. UE may need to store intermediate predictions before predictions of the second set of measurements is calculated by the UE. As an example, if the UE needs to predict the time when a HO is prepared by the Candidate Target cell, it may first need to predict its velocity, direction and location in the future time horizon. A variable can be initiated internally at the UE upon reception of an MDT Configuration indicating that the UE is configured to report predictions.

Additionally, prediction reporting or logging criteria specifying inference can be included in the configuration, such as the following examples:
1) Measurement accuracy.
2) Confidence level.
3) Together with measurement parameters (e.g., RSRP measurement, RSRQ measurement, packet delay, data volume), a set of measurement values (e.g., RSRP values, actual delay values, data volume quantities) can be provided in the configuration to make the UE filter the returned result only to inferred measurements/predictions that are the closest to the values provided in the configuration. A set of measurement values in the configuration can also act as inference stopping conditions: Inference measurements can be stopped/measurement configuration can be invalidated if ML inference measurements do not meet an accuracy condition which could be determined if they fall outside an expected range. An additional parameter can be used in the stopping condition/measurement configuration invalidation namely if inferred data values fall more than a certain distance outside an expected range, and/or if they persistently fall outside a certain range more than a number of times.

C) If the configuration is for both normal measurements and inferred data, then both sets of parameters above should be present. The two sets of parameters do not need to refer to the same measurement, however. For example, a given configuration may request a UE to report RSRP measurements and predict handover success outcomes for a given cell border. This is possible if the UE has indicated that the UE is capable to provide predictions of handover success outcomes.

D) Configuration for inferred measurements should also indicate how the reporting is triggered (e.g., event-based, time-based), when reporting has to stop, and how frequently an inferred measurement should be taken and sent to the network or is logged (e.g., periodically, event-based).

E) For measurements where the configuration parameters (e.g., reporting triggers, intervals, and the like) differ between normal and inferred measurements, the separate configuration instructions should be sent to the UE. For instance, for event-based measurement reporting, the distinct MDT configuration instructions should be indicated to the UE, separately indicating inferred and normal measurements to be performed, along with the relevant triggers for performing such measurements. If it happens that configuration parameters between normal measurements and predictions are the same, then the same configuration may be reused for both types of measurements.

Reported inferred data by a UE can be any of the existing data types, e.g., they may be predictions of existing measurements (e.g., of M1-M9). Predictions may alternatively be predictions of other measurements as long as a UE has indicated capability to provide those. Additionally, inferred data may be part of or contain the following:

1) The same message as actual data but marked as being the result of a model inference. This can be especially the case if the ML Configuration both for normal measurements and ML inference measurements is the same;

2) A separate inference-message which only contains inferred data. This can be the case for example if only inferred measurements are requested to be reported by a UE. This can also be the case if both normal and inferred measurements are requested by a UE but the two types of measurements are requested through different configurations (they can for example have different triggering conditions or a different periodicity);

3) Information on inference accuracy (e.g., in terms of a confidence level or interval); and/or 4) Information on accuracy with which the ML model is trained. "Accuracy" can be defined as the percentage of correct predictions over the overall predictions that use test data. As another metric of accuracy can be "precision", namely what is the percentage of true positives predictions for a certain class as opposed to the overall number of true positives and false positives. Precision can be useful in classification problems. Another metric to indicate accuracy is the "recall" metric which counts the percentage of all the predictions that belong in a class over all the samples that are not only predicted to belong in the class but actually belong in the class. For instance, when one characterizes an ML model to be 99% accurate in its predictions this percentage is calculated by using test data. Other metrics can be related not only to whether a prediction is correct or not but how close a prediction is to the actual value. For instance, mean square error is a frequently used metric since it captures well the prediction errors. The above metrics on prediction accuracy are exemplary and by no means exhaustive.

Besides management-based MDT for the UE selection, where a UE is selected based on an area related to the cells it is connected to, or other signaling-based MDT activation, where a UE is identified based on its e.g., IMSI or IMEI unique identifiers, MDT configuration could also be sent to UEs with specific ML capabilities when ML predictions are to be requested. Therefore, ML-relevant UE capabilities may be introduced, for instance, in the MDT configuration, to limit inference reporting only to selected UEs with one or more capability bits set. Besides ML, UE capabilities configuration could also include types of ML models from which predictions much be reported, e.g., "send predictions only from UEs running Reinforcement Learning", "send predictions only from UEs running Supervised Learning". As another alternative, the configuration may limit ML predictions only from UEs whose predictions meet certain accuracy requirements, such as the metrics of accuracy, precision, recall, mean squared error, to name a few. The above are additional exemplary criteria to filter out the UEs from which predictions are requested.

Now that an overview has been provided, additional detailed information is provided.

Figure 3:
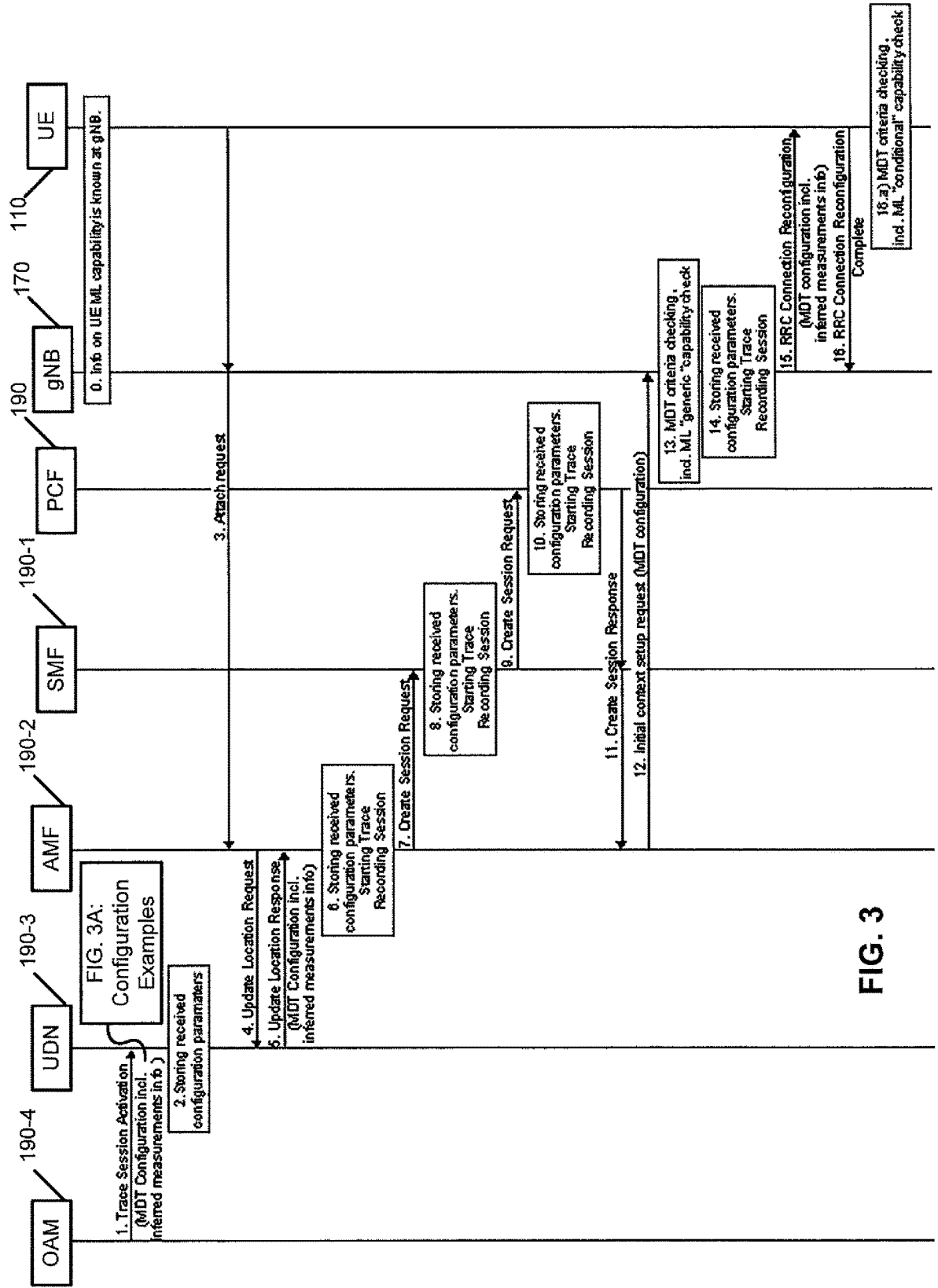
FIG. 3 is a signaling diagram of an example of immediate MDT activation procedure in 5GC and NG-RAN, including the information regarding the inferred measurements, in accordance with an exemplary embodiment.

Turning to FIG. 3, this figure is a signaling diagram of an example of Immediate MDT activation procedure in 5GC and NG-RAN, including the information regarding the inferred measurements, in accordance with an exemplary embodiment. FIG. 3 illustrates the operation of an exemplary method or methods, a result of execution of computer program instructions embodied on a computer readable memory, functions performed by logic implemented in hardware, and/or interconnected means for performing functions in accordance with exemplary embodiment. Each of the UE 110, gNB 170, and network element 190 are assumed to perform their operations under control of their respective control modules 140, 150, and 70.

FIG. 3 illustrates an exemplary procedure for activation of an MDT task, including the information on inferred measurements for the scenario where a UE attaches to the network in 5GC and NG-RAN. The illustrated scenario is an extension of the scenario in 3GPP TS 32.422, Section 4.1.2.17.2, and certain differences are pointed out below. In this example, it is assumed that signaling type of MDT activation is performed. Similar procedures are applicable to a management activation approach. Furthermore, the illustrated procedures are valid for both logged and immediate MDT.

Step 0 is a new step. The UE's ML related capabilities are known to the gNB 170. The UE's ML capabilities are signaled by the UE 110 to the gNB 170, e.g., as part UE MDT capabilities (which is a component of radio access UE capabilities). Consequently, the gNB 170 is made aware of a "generic" capability of the UE to perform ML operations.

However, utilization of such a "generic" ML capability at the UE may be dependent on various factors and may vary in time, e.g., if the UE has sufficient energy to perform the ML inference (e.g., if the UE is connected to power), if the UE has sufficient memory remaining (because the UE may be running other processes or ML models in parallel), and the like. Such AI/ML capability at the UE is referred to herein as "conditional" ML capability.

The selection of UEs to perform the MDT measurements including inferred measurements will be performed at the gNB 170, based on the input information received from management system and the "generic" user ML capabilities information stored in the gNB. The UE may perform additional "conditional" ML capability checking prior to performing the MDT measurements according to the received configuration.

In step 1, the management system (OAM 190-4 in this example) configures the 5GC NE (the UDM 190-3 in this example) with trace control and configuration parameters, including (incl.) the MDT configuration with ML extensions. This may be via a trace session activation message with MDT configuration including (incl.) inferred measurements information (info). In this message, the management system can indicate whether the MDT configuration is only for normal measurements, only for inferred measurements or for both. In FIG. 3A, many more examples for the MDT configuration are illustrated. These are described below.

For step 2, the UDM 190-3 stores the received trace control and configuration parameters including the MDT configuration with ML extensions.

In step 3, the UE 100 attaches to the network via at least the gNB 170 and the AMF 190-2.

For step 4, the AMF 190-2 sends the update location request to the UDM 190-3.

In step 5, the UDM 190-3 sends, in the response to the AMF 190-2, the trace/MDT configuration parameters including, e.g., the following parameters as part of the inferred measurements information (info):

1) Job Type (e.g., immediate or logged MDT);

2) IMSI or IMEISV (International Mobile Station Equipment Identity and Software Version Number) or IMEI or SUPI (Subscription Permanent Identifier) referring to UEs that have ML capabilities;

3) Area scope (e.g., TA, RA, LA, list of cells, Cell);

4) Trace Reference;

5) List of measurements (e.g., M1, M4, M5, M6) including the following information:

a) indication that inferred measurements are to be performed for all measurements in the list in addition to regular measurements, i.e., perform both types of measurements, or b) indication that inferred measurement are to be performed only for selected measurements in the list in addition to regular measurements, or c) indication that only inferred measurements are to be performed, or d) Indication that only regular measurements are to be performed.

In order to indicate the type of measurements that are to be performed, the standardized (currently-existing) bitmap can be extended in different ways. One option is to re-use the spare bit from standardized bitmap (as illustrated in FIG. 4, see bit 8, from 3GPP TS 32.422) and indicate that the alternatively inferred measurements will be performed as opposed to regular measurements (e.g., the bit set to 1, indicating the reporting/logging of predictions is activated) or only regular measurements will be performed (e.g., the bit set to 0, indicating that the reporting/logging of predictions is not activated). Thus, spare bit (bit 8) can be used to indicate that instead of providing the normal measurements M1, M4, M5, M6, the UE needs to provide a prediction of those. As another option, the spare bit 8 can be interpreted as "additionally" so if the bit is set to 1 (one) then UE provides both normal measurements M1, M4, M5, M6 as well as predictions of those. Note however, that using the spare bit is more limiting in what can be signaled since for example either all M1, M4, M5, M6 need to be reported as normal measurements or as inference with a binary indication. To make the configuration more general the spare bit (bit 8) may only be used to indicate that MDT configuration is extended to also include ML predictions. In this case, another bit string can be used to indicate which are the measurements to be predicted. These measurements can be different from M1, M4, M5, M6. They could be given in the trace and/or MDT configuration from the management plane or core network. Using a single MDT configuration for normal measurements and predictions assumes that the measurements to be reported as well as the triggering/stopping conditions and the amount of measurements are the same.

If bit 8 is set in the bit map of FIG. 4, then the UE may report predications based on AI/ML. FIG. 4A is an example of additional octet(s) that may be used, e.g., as part of MDT reporting, in order to report predictions. In this example, there is a second octet with entries "prediction 1" and "prediction 2", each of which is allotted four bits. Additional octets may be used, and different numbers of bits per prediction may be used.

The reporting trigger can be either periodical or event-based, e.g., an A2 event. In addition, the reporting may be triggered once the ML-inferred measurements with certain confidence are available at the UE. Note that the inferred measurements may not have the same semantics as the regular measurements. That is, the value of inferred measurements may indicate the probability that a measurement will be within a certain confidence interval. Therefore, separate MDT configurations may be needed in order to capture such differences between regular and inferred measurements and to allow for specifying different parameter sets, e.g., triggers, reporting intervals relevant for inference versus regular measurements. Such separation of configuration information may be particularly relevant for event-based MDT reporting. This is due to the fact that the trigger for reporting the inferred measurements may be different to regular triggers. For instance, the inferred measurements related to an A2 event may be performed even if the trigger for performing regular A2 measurements is not yet met. Different reporting triggers are illustrated in FIG. 5. This figure is taken from 3GPP TS 32.422, Section 5.10.4, Reporting Trigger. This table illustrates the values of the "reporting trigger" parameter. The parameter is a one-octet-long bitmap and can have the values indicated in the table. The parameter shall not have the combination of periodical, event based and event based periodic reporting at the same time. Note that only one of the bits 1, 2 and 5 can be set at any given time so that event-based and periodical reporting are not in conflict. FIG. 5 can be extended by setting the reserved bit 8 to 1 and by introducing one more bit string. This extra bit string can be used to indicate other reporting triggers as mentioned above, namely "report/log a prediction if it is within a certain confidence interval", "report/log a prediction if it is less than a distance close to a given value", and the like.

Concerning steps 6-11, according to a signaling activation approach, the configured 5GC NE shall propagate the activation to selected NE's in the entire network—RAN (gNB 170 in this example) and core network 101. For this example, in step 6, the AMF 190-2 stores received configuration parameters, starting a trace recording session. The AMF 190-1 signals (step 7) a create session request message to the SMF 190-1, which also stores (step 8) received configuration parameters, starting a trace recording session. The SMF 190-1 signals (step 9) a create session request message to the PCF 190, which also stores (step 10) received configuration parameters, starting a trace recording session. The PCF 190 sends a create session response message to the SMF 190-1 and the AMF 190-2 in step 11.

In step 12, the AMF 1902 sends the MDT configuration parameters to the gNB 170 via an initial context setup request message. The MDT configuration parameters may include one or more of the following.

1) Area scope (e.g., TA, RA, LA, list of cells, Cell).
2) Trace reference.
3) Trace recording session reference.
4) A list of measurements including the following information:

a) indication that inferred measurements should—if possible—be performed for all measurement in the list in addition to regular measurements, or b) indication that inferred measurement should—if possible—be performed only for selected measurements in the list in addition to regular measurements, or c) indication that only inferred measurements should—if possible—be performed, or d) indication that only regular measurements should be performed.

5) Reporting Trigger. For example, the reporting may be triggered once the ML-inferred measurements with certain confidence/accuracy are available at the UE. Separate MDT configurations may be needed if the configuration parameters are different for regular and inferred measurements.

6) Report amount referring to the number of measurements to be reported e.g., in case of periodical triggering.

7) Report interval.
8) Event threshold.
9) Logging interval.
10) Logging duration.
11) IP address of trace collection entity.

12) Collection period for RRM measurements in NR (present only if any of M2 or M3 measurements are requested).

13) Measurement period in NR (if either of the measurements M4, M5 is requested).

14) Positioning method.

15) MDT PLMN list.

16) MDT report type (periodical logged or event-triggered measurement) for logged MDT only.

17) MDT specific events list for event-triggered measurement for logged MDT only.

18) Area Configuration for neighboring cells for logged MDT only.

19) Sensor information for logged MDT and immediate MDT.

In step 13, after the gNB receives the MDT configuration, the MDT criteria will be checked. It is noted that the MDT criteria checking at the gNB is typically only relevant for immediate MDT. For logged MDT, the criteria checking is performed at the UE. The following procedures are envisaged at the gNB 170.

1) The gNB checks if selected IMSI/IMEISV/SUPI fits to the provided area information.

2) The gNB checks if selected IMSI/IMEISV/SUPI are ML-capable.

For the gNB check in (2), the gNB is responsible for "generic" ML-capability checking, i.e., if the UE can perform ML operations or not. The actual ML operation execution at UE according to the configuration information will be dependent on the current conditions at the UE ("conditional" ML capabilities), e.g., memory or power availability, as previously described.

Steps 14-16 include storing the MDT configuration parameters (step 14) by the gNB and the gNB signaling some or all of the parameters to the UE 110. The signaling includes the gNB using an RRC connection reconfiguration message (step 15) with MDT configuration including (incl.) inferred measurements information (info), and a response by the UE in step 16 using an RRC connection reconfiguration complete message.

16.a) For logged MDT, the criteria checking is performed at the UE. Furthermore, the "conditional" criteria checking is performed at the UE. That is, the UE checks its current ML capability, e.g., with respect to available memory or available power level and matches this against the configuration information received. That is, the UE may ensure that all capabilities that are indicated as being required are supported by the UE. For instance, such information may contain the indication/rules when the inference may be performed at the UE, e.g., if the UE's memory is less than 50% (fifty percent) full, and if the UE's battery is more than 50% full, the UE is to perform ML (e.g., using a particular algorithm) as one possible example.

There were examples of MDT configuration that were provided beginning in step 1 of FIG. 3, and further described above. FIG. 3A also illustrates a number of configuration examples for MDT configuration, in accordance with exemplary embodiments. These examples of possible configuration include the following:

1—Normal measurements with corresponding measurement parameters;

2—Inferred measurements with corresponding measurement parameters:

2.a—prediction reporting or logging criteria;

2.b—triggering information for reporting/logging;

2.c—may include indication of expected measurements, e.g., a distance from expected measurements;

2.d—Indication may be related to or include exiting condition(s), e.g., if there are X measurements above a value, stop.

3—The network may use different Signaling Radio Bearers (SRBs) for prediction measurements versus normal measurements. This allows for providing different priorities to normal measurements versus predictions. For instance, the network may use a higher priority SRB for predictions/inferred measurements and a lower priority SRB for transmission of normal measurements.

4—There may be a single configuration, possibly with triggering and/or exiting conditions—could be different (or the same) for normal/ML, or multiple configurations; also, frequencies (or other resources) for measurements could be different.

5—The network may also include priorities, instead of different priority SRBs, such that a higher priority for transmission could be placed on predictions using inferred measurements, and a lower priority for transmission of normal measurements (or the opposite).

As a further example, the measurement parameters for normal measurements may include taking RSRP every 10 ms from zero to 100 ms. The measurement parameters for the inferred measurements may include predicted RSRQ after a time period, such as 30 minutes or five hours. An additional example concerns prediction of handover success, e.g., should the UE be handed over to another cell at a current time or a future time.

Figure 6:
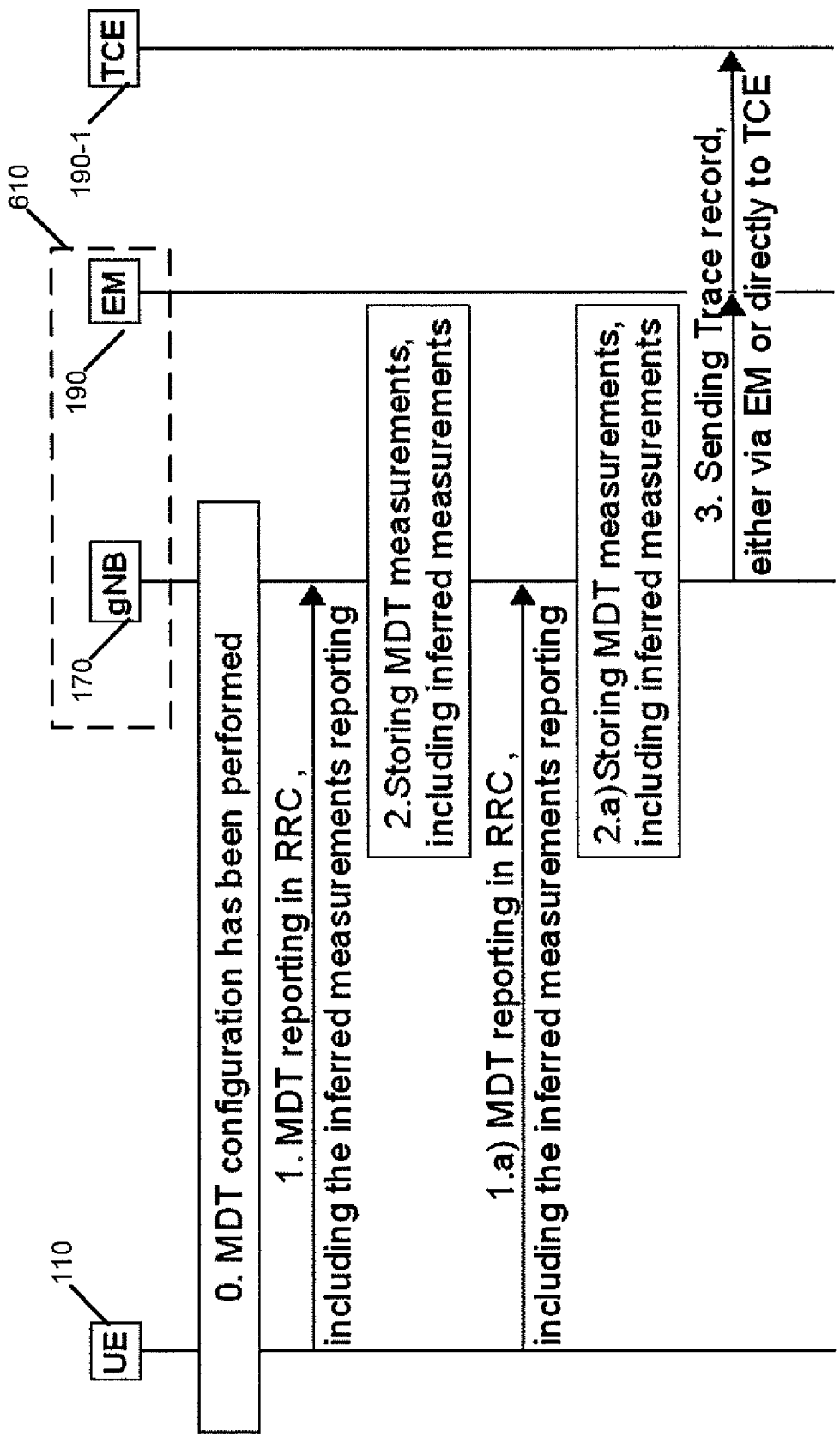
FIG. 6 is a signaling diagram of an exemplary immediate MDT reporting procedure, in accordance with an exemplary embodiment.

FIG. 6 is a signaling diagram of an exemplary immediate MDT reporting procedure, in accordance with an exemplary embodiment. FIG. 6 illustrates the operation of an exemplary method or methods, a result of execution of computer program instructions embodied on a computer readable memory, functions performed by logic implemented in hardware, and/or interconnected means for performing functions in accordance with exemplary embodiment. Each of the UE 110, gNB 170, and network element 190 are assumed to perform their operations under control of their respective control modules 140, 150, and 70. In this case the network elements 190 are the EM 190 and the TCE 190-1.

FIG. 6 illustrates the immediate MDT reporting procedure including the reporting of inferred measurements. The message sequence chart in FIG. 6 is adapted based on 3GPP TS 32.422, FIG. 6.1. Similar extensions related to inferred measurements are applicable also to logged MDT reporting (3GPP TS 32.422, FIG. 6.2). In the figure, file-based reporting has been assumed through streaming-based reporting is also applicable.

In step 0, the MDT configuration has been carried out, between the UE 110 and the gNB 10, as illustrated in FIG. 3 and accompanied text.

In step 1, in case of immediate MDT, the MDT-related measurements are sent in RRC as part of the existing RRC measurements. Such measurements include the measurement values inferred at UE, illustrated in FIG. 6 as being included in the inferred measurements reporting.

In step 2, in response to the gNB receiving the MDT measurements, including the inferred measurement, the gNB 170 saves these to a trace record.

Steps 1.a and 2.a show that multiple reporting and storing may occur before the trace records are sent. That is, there could be steps 1.a to 1.x, and 2.a to 2.x, where "x" is some configured amount of reporting occasions.

For step 3, the trace records are sent to the TCE 190-1 either directly or via the EM 190 (but note the EM can instead reside in the gNB, as illustrated by reference number 610).

Figure 6A:
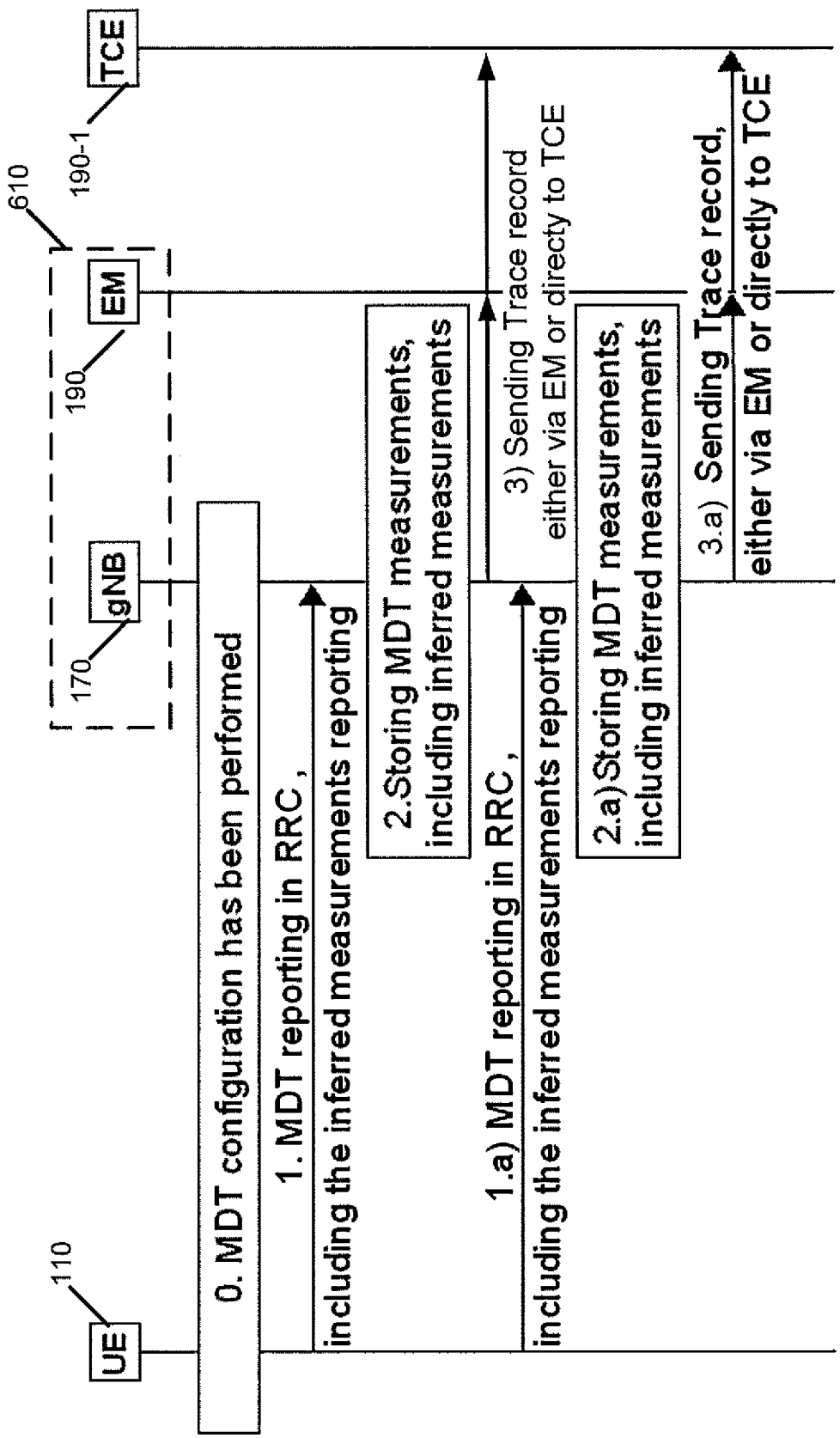
FIG. 6A is a signaling diagram of an exemplary immediate MDT reporting procedure, in accordance with an exemplary embodiment.

FIG. 6 illustrates an option where multiple reports are stored according to file-based methods. FIG. 6A is a signaling diagram of an exemplary immediate MDT reporting procedure, in accordance with an exemplary embodiment, and illustrates another option where reports are sent after reception. This corresponds to streaming-based methods. In this example, there is a step 3 after step 2 and a step 3.a after step 2.a, where the MDT measurements are stored only briefly prior to being sent.

Figure 7A:
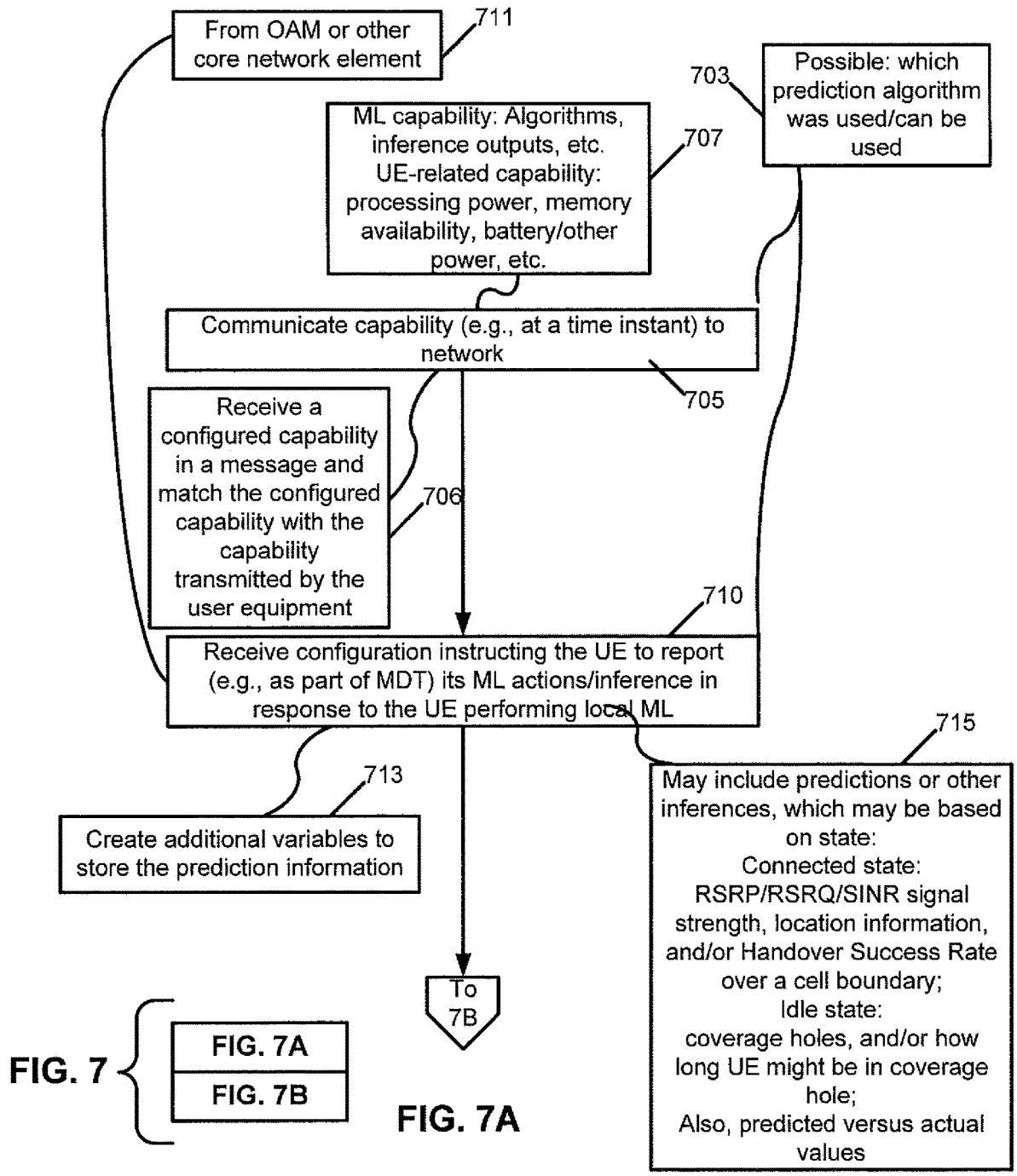
FIGS. 7A and 7B, is a logic flow diagram performed by a UE for AI/ML data collection and usage, and illustrates the operation of an exemplary method or methods, a result of execution of computer program instructions embodied on a computer readable memory, functions performed by logic implemented in hardware, and/or interconnected means for performing functions in accordance with exemplary embodiment.
Figure 7B:
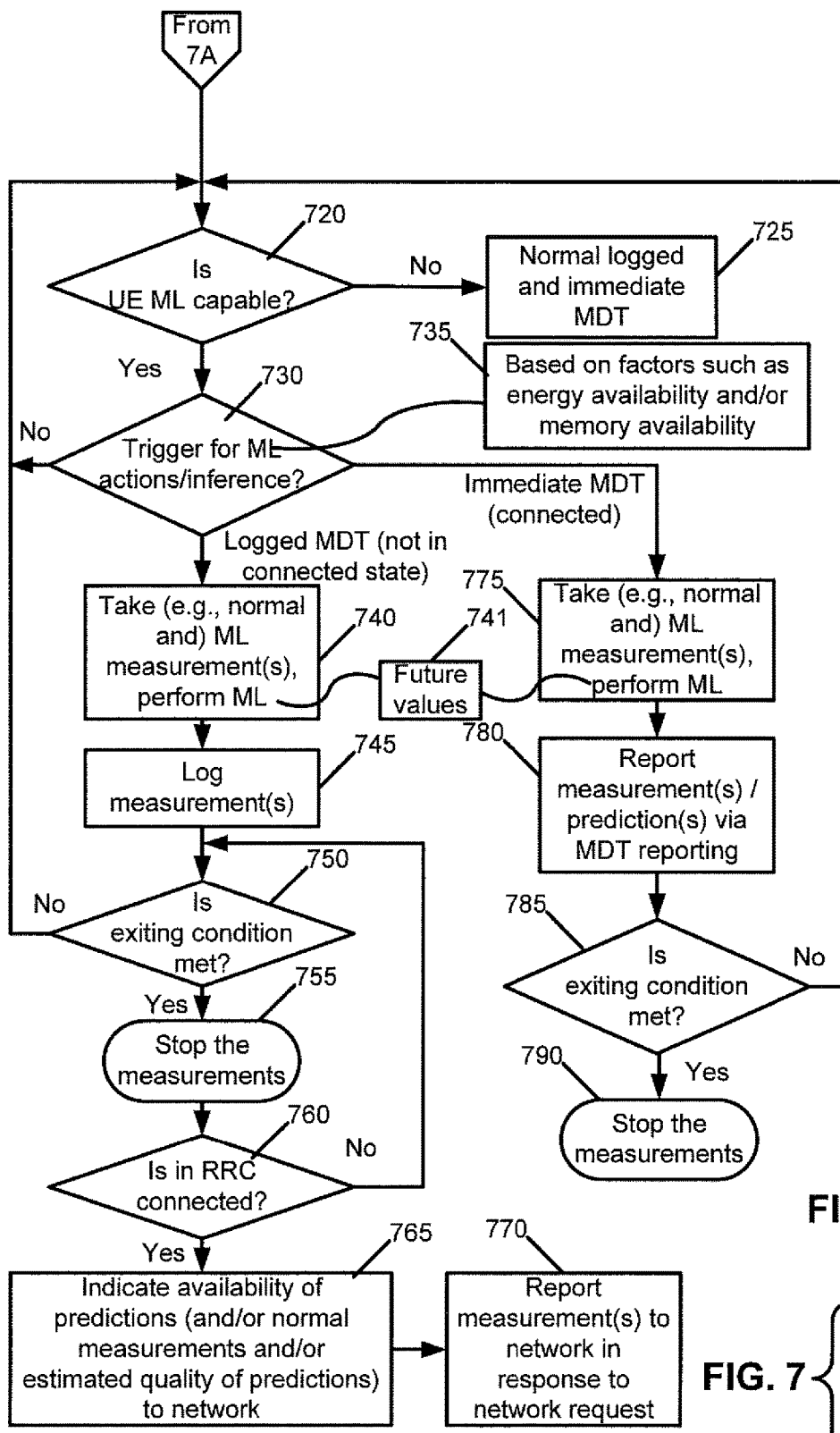

Turning to FIG. 7, split into FIGS. 7A and 7B, this figure is a logic flow diagram performed by a UE for AI/ML data collection and usage. Blocks 703, 705, 710, and 715 are in FIG. 7A, and blocks 720-790 are in FIG. 7B. This figure also illustrates the operation of an exemplary method or methods, a result of execution of computer program instructions embodied on a computer readable memory, functions performed by logic implemented in hardware, and/or interconnected means for performing functions in accordance with exemplary embodiment. In this example, the UE 110 performs the operations in the blocks, e.g., under control of the control module 140.

In block 705, the UE 110 communicates it ML capability to network. See also block 707. As an example, the capability message may indicate capability for the machine learning of the user equipment at a current time instance. For instance, whether or not the UE 110 has any ML capability to perform predictions or not and, if the UE has ML capability, what that capability is (e.g., in terms of MDT). For instance, ML capability can define which types of algorithms can be used by the UE (e.g., whether UE can use Reinforcement Learning, Supervised or Unsupervised Learning methods), with which accuracy the UE can provide measurements, with which frequency these predictions can be provided to network in terms of the amount of predictions that a UE is willing to provide, how many layers of a Neural Network the UE can support, and the like. The UE-related capability may additionally or alternatively include criteria related to internal state of the UE such as processing power, memory availability, battery/other power (e.g., whether connected to a plug-in power source), and the like. That is, the ML capability indication may also be dependent on the UE's internal state, e.g., residual battery, memory, and the like.

In further detail, management(area)-based MDT or other network function using ML may instruct UEs in a certain area to provide measurements (in an example predictions or other inferencing) but this instruction does not mean that all those UEs within some area will have the necessary capability. So, the network may request measurements for UEs having a certain capability that are in a given area. The rest of the UEs in the area for which the capability is not matched, these UEs do not report. Thus, ML capability is another filtering technique to down-select UEs which will be selected to provide AI/ML measurements (e.g., predictions) to the network. In order to achieve this, one option that may be performed is illustrated by block 706, where the UE receives a message having a configured capability (e.g., the capability the network requests) from the access node. The UE matches the configured capability requested by the network with the capability transmitted by the user equipment. As indicated by block 707, the capability may be only an ML capability, a UE-related capability, or some combination of these. For instance, "perform ML Algorithm A to determine Inference B, but only when connected to plug-in power or batter level is above 80 percent".

The UE uses the configured capability to conduct the measuring and the predicting. For instance, assume the ML capability of the UE includes multiple algorithms such as Reinforcement Learning, Supervised or Unsupervised Learning methods. This capability is communicated in block 705, and the network selects Reinforcement Learning (as one example), and sends this as the configured capability in step 706 to the UE. The UE then uses the Reinforcement Learning method.

Similar to this, and as another example, block 703 indicates that the UE can communicate (block 705) a prediction algorithm as an ML algorithm that was used or may be used. In block 706, the network could indicate (as a configured capability) that particular prediction should be used, and the UE then matches the configured capability with the capability the UE sent in block 705.

In block 710, the UE 110 receives configuration instructing the UE to report (e.g., as part of MDT) its ML actions/inference in response to the UE performing local ML. Note that block 703 may be performed with block(s) 705 or 710. Additionally, blocks 705 and 710 may be reversed or combined. As indicated by block 711, the configuration for the UE may be received from an OAM element or another network element, e.g., via the gNB 170.

In a further example, the ML configuration by the network towards the UE may also trigger the creation of additional variables to store the prediction information. See block 713. For example, even though for immediate MDT, the UE does not store internally the measurements but reports them (real-time) to the network, in case of immediate ML inference reporting, the UE may need to store internally inference information if the latter is needed as an intermediate step to calculate the measurement for reporting.

In block 715, the local ML may include predictions or other inferences. A prediction is one type of inference, where a value for a wireless network parameter is inferred in a temporal manner, e.g., at some point after the inference is made. Inferencing is not restricted to predictions, however. For example, real-time wireless network parameters may be inferred. The UE might infer, based on information available to it, parameter(s) the network should measure. The network can then compare the parameter(s) from the UE with the parameter(s) the network actually measures.

The type of predictions or other inferences may depend on the RRC state of the UE, namely whether the UE is in RRC Connected state or whether the UE is in RRC Idle or Inactive states. For example, a UE in RRC Connected state may provide predictions of RSRP/RSRQ/SINR signal strength, of location information, Handover Success Rate over a cell boundary, which may be utilized by the network in real-time. On the other hand, a UE in RRC Idle or Inactive states may estimate additional measurements, for instance insufficient coverage and related information such as how long a UE might have been in a coverage hole, the size of the coverage hole, and the like, which may be reported to the network when the UE is connected again. Such additional information derived using ML may support the network in non-real-time optimization. As a further example, in the case of coverage holes, an idle-mode UE would not "detect" coverage holes because the UE is not connected to the network (i.e., is not in a connected state) but the UE may infer via ML the conclusion that the UE is in a coverage hole or information about the coverage hole, such as the size of the hole, or the area the hole spans, and provide this inference a-posteriori to the network.

Also, predicted values versus actual values may be reported by using the accuracy metrics described earlier. As an example, a UE 110 may have predicted several minutes in a coverage hole, but the actual time may have been longer (or shorter), and the predicted and actual values can be reported. This deviation from the actual values could be also provided to the network through the accuracy metrics, in this case through a mean square error metric for example.

In block 720, the UE determines whether the UE is ML capable. If not (block 720=No), then normal logged and immediate MDT is performed by the UE according to the MDT Configuration. If it is ML Capable (block 720=Yes), the rest of the flowchart is performed, starting with block 730.

In block 730, the UE determines whether there has been a trigger for ML actions/inference. For instance, the trigger may be periodic (e.g., perform MDT once every time period), or based on other criteria such as a handover or radio link failure. The trigger may also be a sudden decrease in UE's performance which can trigger ML at the UE. As indicated by block 735, however, the trigger could be based on factors such as energy availability and/or memory availability at the UE. In other words, if the UE has less than a threshold battery level and/or a threshold of memory, ML actions/inferencing may not be performed if the received MDT Configuration by the UE requires higher battery and memory performance. This is because the MDT Configuration at the UE targeted UEs with a certain ML Capability, that is not met by the current ML Capability at the UE side. There are three possibilities for block 730: No, where the trigger has not occurred (or because of block 735, the trigger has occurred but will not be performed); logged MDT (which may occur for UEs not in connected state); or immediate MDT (which may occur for UEs in connected state). If block 730=No, the flow proceeds back to block 720.

If block 730=Logged MDT, in block 740 the UE 110 takes (e.g., normal and) ML measurement(s), and performs ML. Block 741 indicates that the performance of ML may produce future values, such as value(s) of expected coverage holes, or values of how long the user equipment might be in a coverage hole. The term "future" means, in this context, relative to when the ML is performed. Anything after performance of the ML is in the future. In block 745, the UE logs measurement(s) for MDT. In block 750, the UE 110 determines whether an exiting condition is met. If not (block 750=No), the flow proceeds back to block 720. If the exiting condition is met (block 750=Yes), then the UE stops the measurements in block 755. If the UE is not or has not transitioned into the RRC connected mode while taking ML measurements and performing ML (step 760=No), the flow proceeds back to block 750. If the UE is in or has transitioned into the RRC connected mode while taking ML measurements and performing ML (step 760=Yes), the UE indicates (block 765) availability of predictions (and/or normal measurements and/or estimated quality of predictions) to the network. When the network receives the prediction availability indication by the UE, it will send a message to the UE 110 to request those measurements and UE will send the logged predictions to the network as in block 770. For retrieval of the logged predictions by the network the network can send a UEInformationRequest to the UE indicating request for predictions by setting to 1 a new field that corresponds to the predictions log (e.g., a logPredReportReq field). The UE receiving this indication, can respond to the network and send the predictions report in a variable, e.g., in a newly defined logPredReport variable, sent inside a UEInformationResponse message. The retrieval process is just an example and other procedures can be used so that the network retrieves logs of predictions stored at a UE.

If block 730=Immediate MDT, in block 775, the UE takes (e.g., normal and) ML measurement(s), and performs ML. Block 741 indicates that the performance of ML may produce future values, as previously described. The UE reports measurement(s) and/or predictions via MDT reporting/RRC Signaling in block 780. The UE 110 determines in block 785 whether an exiting condition is met. If not (block 785=No), the flow proceeds to block 720. If an exiting condition is met (block 785=Yes), the flow proceeds to block 790, where the measurements are stopped.

Figure 8:
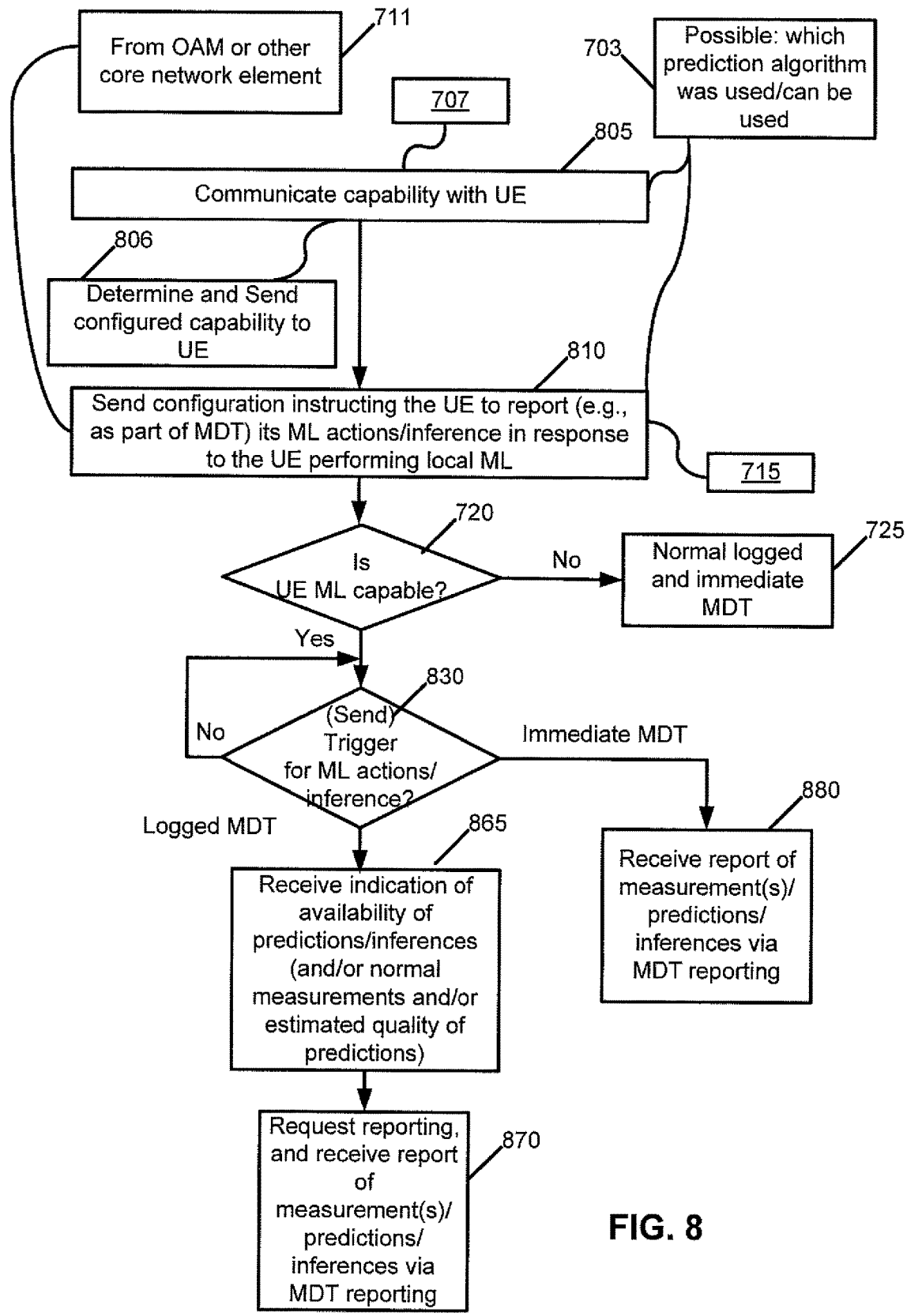
FIG. 8 is a logic flow diagram performed by an access node for AI/ML data collection and usage, and illustrates the operation of an exemplary method or methods, a result of execution of computer program instructions embodied on a computer readable memory, functions performed by logic implemented in hardware, and/or interconnected means for performing functions in accordance with exemplary embodiment.

Referring to FIG. 8, this figure is a logic flow diagram performed by an access node for AI/ML data collection and usage. This figure also illustrates the operation of an exemplary method or methods, a result of execution of computer program instructions embodied on a computer readable memory, functions performed by logic implemented in hardware, and/or interconnected means for performing functions in accordance with exemplary embodiment. The operations in FIG. 8 are assumed to be performed by a gNB 170 or other access node, e.g., under control of the control module 150.

For FIG. 8, some of the blocks have already been described above, such as blocks 703, 707, 711, 715, 720, and 725. For these examples, the access node interacts with the UE as previously described. Many of the blocks in FIG. 8 also mirror similar blocks in FIG. 7, and as such the description above applies here too. For example, both blocks 705 and 805 are related to the UE communicating capability to the access node, and the description above has most or all of the information for these blocks.

In block 805, the access node receives UE communicating capability from the UE, as previously described. In block 806, the access node determines and sends the configured capability to the UE. The UE would perform matching, as described above, based on the configured capability. In block 810, the access node sends configuration instructing the UE to report (e.g., as part of MDT) its ML actions/inference in response to the UE performing local ML. This has already been described above. Blocks 720 and 725 have also been described above.

In block 830, there could be a trigger to ML actions/inferencing. It is noted that the access node may, in certain cases, send such a trigger to the UE to cause ML actions/inferencing and/or corresponding reporting. A typical case, however, will be that the access node is reactive to the UE's logged and immediate MDT (or other inference reporting). If there is no trigger (block 830=No), the access node waits. If there is a trigger relating to immediate MDT (block 830=immediate MDT), the access node in block 880 receives report of measurement(s)/predictions/inferences via, e.g., MDT reporting.

If there is a trigger relating logged MDT (block 830=logged MDT), in block 865, the access node in block 865 receives indication of availability of predictions/inferences (and/or normal measurements and/or estimated quality of predictions/inferences). In block 870, the access node requests reporting, and receives report(s) of measurement(s)/predictions/inferences via MDT reporting.

The following are additional examples.

Example 1. A method, comprising, transmitting by a user equipment a capability message to an access node in a wireless network, wherein the capability message indicates capability corresponding to machine learning of the user equipment at a current time instance;

receiving, by the user equipment from the access node, a configuration message for radio measurements, the message indicating one or more sets of parameters to be measured;

receiving by the user equipment a configured capability in a message from the access node and matching by the user equipment the configured capability with the capability of the user equipment at the current time instance;

measuring by the user equipment the one or more sets of parameters;

using machine learning to infer one or more values for at least one of the parameters in the one or more sets of parameters based on the measured one or more sets of parameters and based on the received configured capability; and reporting from the user equipment to the access node the inferred one or more values for the at least one parameter.

Example 2. The method of example 1, wherein the one or more sets of parameters comprise:

a first set of parameters for logged and immediate measurements; and a second set of parameters for performing the machine learning, wherein the at least one parameter is from the second set of parameters.

Example 3. The method of any one of examples 1 or 2, wherein the inferred one or more values are predicted one or more future values.

Example 4. The method of example 3, wherein the first and second sets of parameters are for minimization of drive tests.

Example 5. The method of example 4, wherein the predicted one or more future values for the at least one parameter for minimization of drive test events comprise one or more of information corresponding to estimated coverage holes, or how long the user equipment might have been in a coverage hole.

Example 6. The method of any one of examples 4 to 5, wherein the reporting comprises both the inferred one or more values for the at least one parameter and actual measured values corresponding to the inferred one or more values.

Example 7. The method of any one of examples 1 to 6, wherein:

the method further comprises logging by the user equipment at least one of multiple measurements of the one or more sets of parameters or multiple inferred values; and the reporting comprises reporting from the user equipment to the access node at least one of the logged multiple measurements of the one or more sets of parameters or logged multiple inferred values.

Example 8. The method of example 7, wherein:

the method further comprises indicating, prior to the reporting, by the user equipment to the access node, availability of the logged multiple inferred values; and the reporting is performed in response to a request from the wireless network for the user equipment to report logged measurements.

Example 9. The method of any one of examples 1 to 8, wherein the using machine learning to infer one or more values is performed in response to one or more of energy availability or memory availability or processing power meeting corresponding thresholds.

Example 10. The method of any one of examples 1 to 9, wherein the capability corresponding to the machine learning of the user equipment at a current time instance comprises one or both of capability for machine learning or capability related to internal state of the user equipment.

Example 11. The method of any one of examples 1 to 10, wherein at least indications of one or more sets of parameters to be measured in the configuration message originate at an operations, administration, and maintenance element or other core network element of the wireless network.

Example 12. A method, comprising:

receiving, at an access node in a wireless network from a user equipment in the wireless network, a capability message indicating capability corresponding to machine learning of the user equipment at a current time instance;

sending, by the access node to the user equipment, a configuration message for radio measurements, the message indicating one or more sets of parameters to be measured by the user equipment and to be used for machine learning to infer one or more values for at least one of the parameters in the one or more sets of parameters;

sending, by the access node to the user equipment, a configured capability from the access node corresponding to the capability message received from the user equipment and to be used by the user equipment for the machine learning; and receiving, by the access node from the user equipment, reporting indicating the inferred one or more values for the at least one parameter in the one or more sets of parameters.

Example 13. The method of example 12, wherein the one or more sets of parameters comprise:

a first set of parameters for logged and immediate measurements; and a second set of parameters for performing the machine learning, wherein the at least one parameter is from the second set of parameters.

Example 14. The method of any one of examples 12 or 13, wherein the inferred one or more values are predicted one or more future values.

Example 15. The method of example 14, wherein the first and second sets of parameters are for minimization of drive tests.

Example 16. The method of example 15, wherein the predicted one or more future values for the at least one parameter for minimization of drive test events comprise one or more of information corresponding to estimated coverage holes, or how long the user equipment might have been in a coverage hole.

Example 17. The method of any one of examples 15 to 16, wherein the reporting comprises both the inferred one or more values for the at least one parameter and actual values corresponding to the inferred one or more values.

Example 18. The method of any one of examples 12 to 17, wherein:

the receiving reporting comprises receiving reporting from the user equipment of at least one of logged multiple measurements of the one or more sets of parameters or logged multiple inferred values.

Example 19. The method of example 18, wherein:

the method further comprises receiving, prior to the receiving reporting, indication from the user equipment of availability of the logged multiple inferred values; and requesting by the access node for the user equipment to report logged measurements in response to reception of the indication of availability.

Example 20. The method of any one of examples 12 to 19, wherein the capability corresponding to the machine learning of the user equipment at a current time instance comprises one or both of capability for machine learning or capability related to internal state of the user equipment.

Example 21. The method of any one of examples 12 to 20, wherein at least indications of one or more sets of parameters to be measured in the configuration message originate at an operations, administration, and maintenance element or other core network element of the wireless network.

Example 22. A computer program, comprising code for performing the methods of any of examples 1 to 21, when the computer program is run on a computer.

Example 23. The computer program according to example 22, wherein the computer program is a computer program product comprising a computer-readable medium bearing computer program code embodied therein for use with the computer.

Example 24. The computer program according to example 22, wherein the computer program is directly loadable into an internal memory of the computer.

Example 25. An apparatus, comprising:
one or more processors; and
one or more memories including computer program code,
wherein the one or more memories and the computer program code are configured, with the one or more processors, to cause the apparatus to:
transmit by a user equipment a capability message to an access node in a wireless network, wherein the capability message indicates capability corresponding to machine learning of the user equipment at a current time instance;
receive, by the user equipment from the access node, a configuration message for radio measurements, the message indicating one or more sets of parameters to be measured;
receive by the user equipment a configured capability in a message from the access node and matching by the user equipment the configured capability with the capability of the user equipment at the current time instance;
measure by the user equipment the one or more sets of parameters;
use machine learning to infer one or more values for at least one of the parameters in the one or more sets of parameters based on the measured one or more sets of parameters and based on the received configured capability; and
report from the user equipment to the access node the inferred one or more values for the at least one parameter.

Example 26. The apparatus of example 25, wherein the one or more sets of parameters comprise:
a first set of parameters for logged and immediate measurements; and
a second set of parameters for performing the machine learning, wherein the at least one parameter is from the second set of parameters.

Example 27. The apparatus of any one of examples 25 or 26, wherein the inferred one or more values are predicted one or more future values.

Example 28. The apparatus of example 27, wherein the first and second sets of parameters are for minimization of drive tests.

Example 29. The apparatus of example 28, wherein the predicted one or more future values for the at least one parameter for minimization of drive test events comprise one or more of information corresponding to estimated coverage holes, or how long the user equipment might have been in a coverage hole.

Example 30. The apparatus of any one of examples 28 to 29, wherein the reporting comprises both the inferred one or more values for the at least one parameter and actual measured values corresponding to the inferred one or more values.

Example 31. The apparatus of any one of examples 25 to 30, wherein:
the one or more memories and the computer program code are further configured, with the one or more processors, to cause the apparatus to: log by the user equipment at least one of: multiple measurements of the one or more sets of parameters or multiple inferred values; and
the reporting comprises reporting from the user equipment to the access node at least one of the logged multiple measurements of the one or more sets of parameters or logged multiple inferred values.

Example 32. The apparatus of example 31, wherein:
the one or more memories and the computer program code are further configured, with the one or more processors, to cause the apparatus to: indicate, prior to the reporting, by the user equipment to the access node, availability of the logged multiple inferred values; and
the reporting is performed in response to a request from the wireless network for the user equipment to report logged measurements.

Example 33. The apparatus of any one of examples 25 to 32, wherein the using machine learning to infer one or more values is performed in response to one or more of energy availability or memory availability or processing power meeting corresponding thresholds.

Example 34. The apparatus of any one of examples 25 to 33, wherein the capability corresponding to the machine learning of the user equipment at a current time instance comprises one or both of capability for machine learning or capability related to internal state of the user equipment.

Example 35. The apparatus of any one of examples 25 to 34, wherein at least indications of one or more sets of parameters to be measured in the configuration message originate at an operations, administration, and maintenance element or other core network element of the wireless network.

Example 36. An apparatus, comprising:
one or more processors; and
one or more memories including computer program code,
wherein the one or more memories and the computer program code are configured, with the one or more processors, to cause the apparatus to:
receive, at an access node in a wireless network from a user equipment in the wireless network, a capability message indicating capability corresponding to machine learning of the user equipment at a current time instance;
send, by the access node to the user equipment, a configuration message for radio measurements, the message indicating one or more sets of parameters to be measured by the user equipment and to be used for machine learning to infer one or more values for at least one of the parameters in the one or more sets of parameters;
send, by the access node to the user equipment, a configured capability from the access node corresponding to the capability message received from the user equipment and to be used by the user equipment for the machine learning; and
receive, by the access node from the user equipment, reporting indicating the inferred one or more values for the at least one parameter in the one or more sets of parameters.

Example 37. The apparatus of example 36, wherein the one or more sets of parameters comprise:
a first set of parameters for logged and immediate measurements; and
a second set of parameters for performing the machine learning, wherein the at least one parameter is from the second set of parameters.

Example 38. The apparatus of any one of examples 36 or 37, wherein the inferred one or more values are predicted one or more future values.

Example 39. The apparatus of example 38, wherein the first and second sets of parameters are for minimization of drive tests.

Example 40. The apparatus of example 39, wherein the predicted one or more future values for the at least one parameter for minimization of drive test events comprise one or more of information corresponding to estimated coverage holes, or how long the user equipment might have been in a coverage hole.

Example 41. The apparatus of any one of examples 39 to 40, wherein the reporting comprises both the inferred one or more values for the at least one parameter and actual values corresponding to the inferred one or more values.

Example 42. The apparatus of any one of examples 36 to 41, wherein:

the receiving reporting comprises receiving reporting from the user equipment of at least one of logged multiple measurements of the one or more sets of parameters or logged multiple inferred values.

Example 43. The apparatus of example 42, wherein:

the one or more memories and the computer program code are further configured, with the one or more processors, to cause the apparatus to: receive, prior to the receiving reporting, indication from the user equipment of availability of the logged multiple inferred values; and requesting by the access node for the user equipment to report logged measurements in response to reception of the indication of availability.

Example 44. The apparatus of any one of examples 36 to 43, wherein the capability corresponding to the machine learning of the user equipment at a current time instance comprises one or both of capability for machine learning or capability related to internal state of the user equipment.

Example 45. The apparatus of any one of examples 36 to 44, wherein at least indications of one or more sets of parameters to be measured in the configuration message originate at an operations, administration, and maintenance element or other core network element of the wireless network.

Example 46. An apparatus comprising means for performing:

transmitting by a user equipment a capability message to an access node in a wireless network, wherein the capability message indicates capability corresponding to machine learning of the user equipment at a current time instance;

receiving, by the user equipment from the access node, a configuration message for radio measurements, the message indicating one or more sets of parameters to be measured;

receiving by the user equipment a configured capability in a message from the access node and matching by the user equipment the configured capability with the capability of the user equipment at the current time instance;

measuring by the user equipment the one or more sets of parameters;

using machine learning to infer one or more values for at least one of the parameters in the one or more sets of parameters based on the measured one or more sets of parameters and based on the received configured capability; and reporting from the user equipment to the access node the inferred one or more values for the at least one parameter.

Example 47. The apparatus of example 46, wherein the one or more sets of parameters comprise:

a first set of parameters for logged and immediate measurements; and a second set of parameters for performing the machine learning, wherein the at least one parameter is from the second set of parameters.

Example 48. The apparatus of any one of examples 46 or 47, wherein the inferred one or more values are predicted one or more future values.

Example 49. The apparatus of example 48, wherein the first and second sets of parameters are for minimization of drive tests.

Example 50. The apparatus of example 49, wherein the predicted one or more future values for the at least one parameter for minimization of drive test events comprise one or more of information corresponding to estimated coverage holes, or how long the user equipment might have been in a coverage hole.

Example 51. The apparatus of any one of examples 49 to 50, wherein the reporting comprises both the inferred one or more values for the at least one parameter and actual measured values corresponding to the inferred one or more values.

Example 52. The apparatus of any one of examples 46 to 51, wherein:

the means are further configured for performing: logging by the user equipment at least one of: multiple measurements of the one or more sets of parameters or multiple inferred values; and the reporting comprises reporting from the user equipment to the access node at least one of the logged multiple measurements of the one or more sets of parameters or logged multiple inferred values.

Example 53. The apparatus of example 52, wherein:

the means are further configured for performing: indicating, prior to the reporting, by the user equipment to the access node, availability of the logged multiple inferred values; and the reporting is performed in response to a request from the wireless network for the user equipment to report logged measurements.

Example 54. The apparatus of any one of examples 46 to 53, wherein the using machine learning to infer one or more values is performed in response to one or more of energy availability or memory availability or processing power meeting corresponding thresholds.

Example 55. The apparatus of any one of examples 46 to 54, wherein the capability corresponding to the machine learning of the user equipment at a current time instance comprises one or both of capability for machine learning or capability related to internal state of the user equipment.

Example 56. The apparatus of any one of examples 46 to 55, wherein at least indications of one or more sets of parameters to be measured in the configuration message originate at an operations, administration, and maintenance element or other core network element of the wireless network.

Example 57. An apparatus comprising means for performing:

receiving, at an access node in a wireless network from a user equipment in the wireless network, a capability message indicating capability corresponding to machine learning of the user equipment at a current time instance;

sending, by the access node to the user equipment, a configuration message for radio measurements, the message indicating one or more sets of parameters to be measured by the user equipment and to be used for machine learning to infer one or more values for at least one of the parameters in the one or more sets of parameters;

sending, by the access node to the user equipment, a configured capability from the access node corresponding to the capability message received from the user equipment and to be used by the user equipment for the machine learning; and receiving, by the access node from the user equipment, reporting indicating the inferred one or more values for the at least one parameter in the one or more sets of parameters.

Example 58. The apparatus of example 57, wherein the one or more sets of parameters comprise:

a first set of parameters for logged and immediate measurements; and a second set of parameters for performing the machine learning, wherein the at least one parameter is from the second set of parameters.

Example 59. The apparatus of any one of examples 57 or 58, wherein the inferred one or more values are predicted one or more future values.

Example 60. The apparatus of example 59, wherein the first and second sets of parameters are for minimization of drive tests.

Example 61. The apparatus of example 60, wherein the predicted one or more future values for the at least one parameter for minimization of drive test events comprise one or more of information corresponding to estimated coverage holes, or how long the user equipment might have been in a coverage hole.

Example 62. The apparatus of any one of examples 60 to 61, wherein the reporting comprises both the inferred one or more values for the at least one parameter and actual values corresponding to the inferred one or more values.

Example 63. The apparatus of any one of examples 57 to 62, wherein:

the receiving reporting comprises receiving reporting from the user equipment of at least one of logged multiple measurements of the one or more sets of parameters or logged multiple inferred values.

Example 64. The apparatus of example 63, wherein:

the means are further configured for performing: receiving, prior to the receiving reporting, indication from the user equipment of availability of the logged multiple inferred values; and requesting by the access node for the user equipment to report logged measurements in response to reception of the indication of availability.

Example 65. The apparatus of any one of examples 57 to 64, wherein the capability corresponding to the machine learning of the user equipment at a current time instance comprises one or both of capability for machine learning or capability related to internal state of the user equipment.

Example 66. The apparatus of any one of examples 57 to 65, wherein at least indications of one or more sets of parameters to be measured in the configuration message originate at an operations, administration, and maintenance element or other core network element of the wireless network.

Example 67. The apparatus of any one of apparatus examples 46 to 66, wherein the means comprises:

at least one processor; and at least one memory including computer program code, the at least one memory and computer program code configured to, with the at least one processor, cause the performance of the apparatus.

Without in any way limiting the scope, interpretation, or application of the claims appearing below, a technical effect and advantage of one or more of the example embodiments disclosed herein enables triggering of a new type of measurements corresponding to predictions and ML inference from UE to the network. Another technical effect or advantage of one or more of the example embodiments disclosed herein is providing the means to report those measurements (either in real time or through logging) to the network.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AI artificial intelligence
AMF access and mobility management function
CM control module
CU central unit
DL downlink, from the network toward the UE
DRB Data Radio Bearer
DU distributed unit
EM Element Manager
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HO handover
I/F interface
IMSI International Mobile Subscriber Identity
IP internet protocol
KPI key performance indicator
LTE long term evolution
MAC medium access control
MDT Minimization of Drive Tests
ML machine learning
MME mobility management entity
NE network element
NF network function
ng or NG next generation
ng-eNB or NG-eNB next generation eNB
NR new radio
N/W or NW network
NWDAF network data analytics function
OAM operations, administration, and maintenance
PDCP packet data convergence protocol
PHY physical layer
PM performance measurement
RAN radio access network
Rel release
RL reinforcement learning
RLC radio link control
RRC radio resource control
RRH remote radio head
RRM radio resource management
RSRP Reference Signal Received Power
RSRQ Reference Signal Received Quality.
RSSI Received Signal Strength Indicator
RT real-time
RTT round-trip time
RU radio unit
Rx receiver
SDAP service data adaptation protocol
SGW serving gateway
SID study item description
SON Self-Optimizing/Organizing Network
SL supervised learning
SMF session management function
SRB signaling radio bearer
TA tracking area
TCE Trace Collection Entity
TS technical specification
Tx transmitter
UDM unified data management
UE user equipment (e.g., a wireless, typically mobile device)
UL uplink, from the UE toward the network
UPF user plane function
WLAN wide local area network

What is claimed is:

1. A method, comprising,
transmitting by a user equipment a capability message to an access node in a wireless network, wherein the capability message indicates capability corresponding to machine learning of the user equipment at a current time instance;
receiving, by the user equipment from the access node, a configuration message for radio measurements, the message indicating one or more sets of parameters to be measured;
receiving by the user equipment a configured capability in a message from the access node and matching by the user equipment the configured capability with the capability of the user equipment at the current time instance;
measuring by the user equipment the one or more sets of parameters;
using machine learning to infer one or more values for at least one of the parameters in the one or more sets of parameters based on the measured one or more sets of parameters and based on the received configured capability; and
reporting from the user equipment to the access node the inferred one or more values for the at least one parameter.

2. An apparatus, comprising:
one or more processors; and
one or more memories including computer program code,
wherein the one or more memories and the computer program code are configured, with the one or more processors, to cause the apparatus to:
transmit by a user equipment a capability message to an access node in a wireless network, wherein the capability message indicates capability corresponding to machine learning of the user equipment at a current time instance;
receive, by the user equipment from the access node, a configuration message for radio measurements, the message indicating one or more sets of parameters to be measured;
receive by the user equipment a configured capability in a message from the access node and matching by the user equipment the configured capability with the capability of the user equipment at the current time instance;
measure by the user equipment the one or more sets of parameters;
use machine learning to infer one or more values for at least one of the parameters in the one or more sets of parameters based on the measured one or more sets of parameters and based on the received configured capability; and
report from the user equipment to the access node the inferred one or more values for the at least one parameter.

3. The apparatus of claim 2, wherein the one or more sets of parameters comprise:

a first set of parameters for logged and immediate measurements; and a second set of parameters for performing the machine learning, wherein the at least one parameter is from the second set of parameters.

4. The apparatus of claim 2, wherein the inferred one or more values are predicted one or more future values.

5. The apparatus of claim 4, wherein the first and second sets of parameters are for minimization of drive tests.

6. The apparatus of claim 5, wherein the predicted one or more future values for the at least one parameter for minimization of drive test events comprise one or more of information corresponding to estimated coverage holes, or how long the user equipment might have been in a coverage hole.

7. The apparatus of claim 5, wherein the reporting comprises both the inferred one or more values for the at least one parameter and actual measured values corresponding to the inferred one or more values.

8. The apparatus of claim 2, wherein:
the one or more memories and the computer program code are further configured, with the one or more processors, to cause the apparatus to: log by the user equipment at least one of: multiple measurements of the one or more sets of parameters or multiple inferred values; and
the reporting comprises reporting from the user equipment to the access node at least one of the logged multiple measurements of the one or more sets of parameters or logged multiple inferred values.

9. The apparatus of claim 8, wherein:
the one or more memories and the computer program code are further configured, with the one or more processors, to cause the apparatus to: indicate, prior to the reporting, by the user equipment to the access node, availability of the logged multiple inferred values; and
the reporting is performed in response to a request from the wireless network for the user equipment to report logged measurements.

10. The apparatus of claim 2, wherein the using machine learning to infer one or more values is performed in response to one or more of energy availability or memory availability or processing power meeting corresponding thresholds.

11. The apparatus of claim 2, wherein the capability corresponding to the machine learning of the user equipment at a current time instance comprises one or both of capability for machine learning or capability related to internal state of the user equipment.

12. An apparatus, comprising:
one or more processors; and
one or more memories including computer program code, wherein the one or more memories and the computer program code are configured, with the one or more processors, to cause the apparatus to:
receive, at an access node in a wireless network from a user equipment in the wireless network, a capability message indicating capability corresponding to machine learning of the user equipment at a current time instance;

send, by the access node to the user equipment, a configuration message for radio measurements, the message indicating one or more sets of parameters to be measured by the user equipment and to be used for machine learning to infer one or more values for at least one of the parameters in the one or more sets of parameters;

send, by the access node to the user equipment, a configured capability from the access node corresponding to the capability message received from the user equipment and to be used by the user equipment for the machine learning; and receive, by the access node from the user equipment, reporting indicating the inferred one or more values for the at least one parameter in the one or more sets of parameters.

13. The apparatus of claim 12, wherein the one or more sets of parameters comprise:
a first set of parameters for logged and immediate measurements; and
a second set of parameters for performing the machine learning, wherein the at least one parameter is from the second set of parameters.

14. The apparatus of claim 12, wherein the inferred one or more values are predicted one or more future values.

15. The apparatus of claim 14, wherein the first and second sets of parameters are for minimization of drive tests.

16. The apparatus of claim 15, wherein the reporting comprises both the inferred one or more values for the at least one parameter and actual values corresponding to the inferred one or more values.

17. The apparatus of claim 12, wherein:
the receiving reporting comprises receiving reporting from the user equipment of at least one of logged multiple measurements of the one or more sets of parameters or logged multiple inferred values.

18. The apparatus of claim 17, wherein:
the one or more memories and the computer program code are further configured, with the one or more processors, to cause the apparatus to: receive, prior to the receiving reporting, indication from the user equipment of availability of the logged multiple inferred values; and
requesting by the access node for the user equipment to report logged measurements in response to reception of the indication of availability.

19. The apparatus of claim 12, wherein the capability corresponding to the machine learning of the user equipment at a current time instance comprises one or both of capability for machine learning or capability related to internal state of the user equipment.

20. The apparatus of claim 12, wherein at least indications of one or more sets of parameters to be measured in the configuration message originate at an operations, administration, and maintenance element or other core network element of the wireless network.

* * * * *